United States Patent [19]

Kammersgard et al.

[11] Patent Number: 5,737,189
[45] Date of Patent: Apr. 7, 1998

[54] HIGH PERFORMANCE MASS STORAGE SUBSYSTEM

[75] Inventors: Dana W. Kammersgard, Escondido; Angus R. Colson, Jr., Jamul; Steven B. Cook, Vista, all of Calif.

[73] Assignee: Artecon, Carlsbad, Calif.

[21] Appl. No.: 760,726

[22] Filed: Dec. 5, 1996

Related U.S. Application Data

[63] Continuation-in-part of Ser. No. 179,082, Jan. 10, 1994, Pat. No. 5,400,470, and Ser. No. 265,208, Jun. 24, 1994, Pat. No. 5,505,533, and a continuation of Ser. No. 295,280, Aug. 24, 1994.

[51] Int. Cl.⁶ .................................. G06F 1/16; H05K 5/02
[52] U.S. Cl. ...................... 361/726; 361/727; 312/107.5; 312/223.2
[58] Field of Search .................................. 361/679, 680, 361/681, 682, 687, 695, 724–727, 800, 816, 818; 312/107, 107.5, 111, 223.1, 223.2; 174/68.1, 72 A, 683; 364/708.1; G06F 1/16

[56] References Cited

U.S. PATENT DOCUMENTS

| | | | |
|---|---|---|---|
| 3,430,662 | 3/1969 | Guarnaschelli | 174/135 |
| 3,751,127 | 8/1973 | Black, Jr. et al. | 312/211 |
| 3,999,818 | 12/1976 | Schankler | 312/107 |
| 4,558,914 | 12/1985 | Prager et al. | 361/393 |
| 4,702,535 | 10/1987 | Beun | 312/308 |
| 4,870,643 | 9/1989 | Bultman et al. | 371/11.1 |
| 4,996,628 | 2/1991 | Harvey et al. | 361/393 |
| 5,112,119 | 5/1992 | Cooke et al. | 312/283 |
| 5,131,272 | 7/1992 | Minei et al. | 361/685 |
| 5,193,050 | 3/1993 | Dimmick et al. | 361/687 |
| 5,206,772 | 4/1993 | Hirano et al. | 361/695 |
| 5,227,957 | 7/1993 | Deters | 361/395 |
| 5,247,427 | 9/1993 | Driscoll et al. | 361/685 |
| 5,251,106 | 10/1993 | Hui | 361/744 |
| 5,254,809 | 10/1993 | Martin | 174/68.3 |
| 5,282,678 | 2/1994 | Teufel et al. | 312/107.5 |
| 5,333,097 | 7/1994 | Christensen et al. | 361/685 |
| 5,379,184 | 1/1995 | Barraza et al. | 361/685 |
| 5,381,315 | 1/1995 | Hamaguchi et al. | 361/717 |
| 5,412,534 | 5/1995 | Cutts et al. | 361/695 |
| 5,414,591 | 5/1995 | Kimura et al. | 361/695 |

*Primary Examiner*—Lynn D. Feild
*Attorney, Agent, or Firm*—John J. Murphey; Murphey Law Offices

[57] ABSTRACT

A computer subsystem including stackable, interlocking, modular peripheral containment enclosures, each the enclosure including broad top and bottom walls held in spaced-apart arrangement by opposed shorter side walls and a rear wall, the walls joined along their respective marginal edges to form an enclosure cavity accessible through the front opening formed thereby, a device extending rearward from the front opening interior the cavity for receiving therealong an enclosed sled containing a computer peripheral, in controlled alignment, the sled including a front face that aligns flush against the front enclosure opening when the sled is fully seated in the cavity, a device for electrically interconnecting the peripheral to a connectable connector in the enclosure, a device for providing an air cooling throughout the cavity including an aperture formed in at least one the side wall for passage of air therethrough, and a device for interconnecting a plurality of the enclosures in horizontal or vertical arrangement external the enclosure walls for positioning on a flat surface including device for maintaining a space between the flat surface and the enclosure wall nearest the surface.

2 Claims, 22 Drawing Sheets

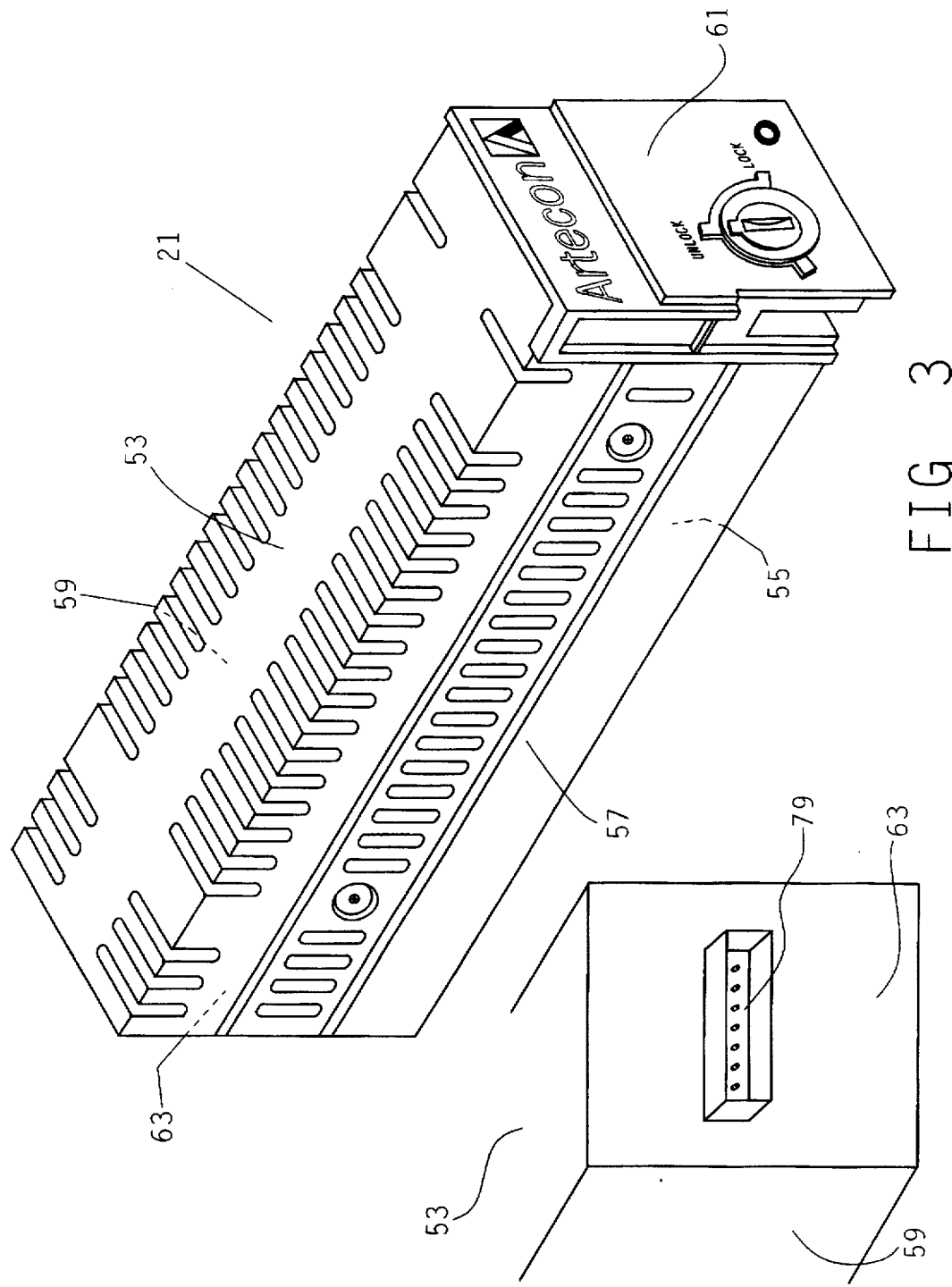

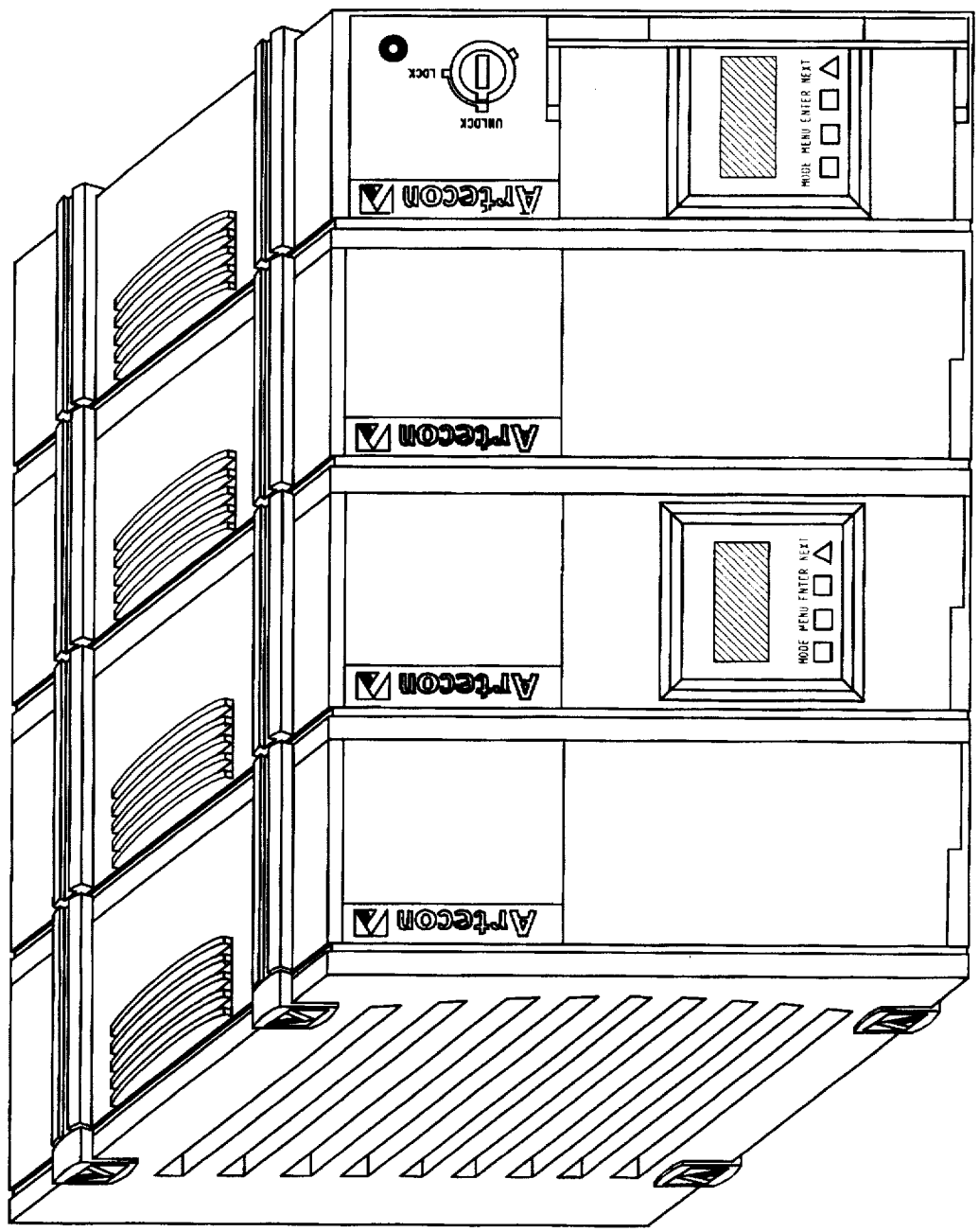

HIGH PERFORMANCE MASS STORAGE SUBSYSTEM

RELATION TO OTHER PATENT APPLICATIONS

This application is a Continuation-in-Part of our previously filed patent applications, one titled, "SELF-CAPTURING ARTICULATING CHEST HANDLE", filed Jan. 10, 1994 and given Ser. No. 08/179,082 now U.S. Pat. No. 5,400,470; and the other titled, "RACKMOUNT FOR COMPUTER AND MASS STORAGE ENCLOSURE", filed Jun. 24, 1994, and given Ser. No. 08/265,208 now U.S. Pat. No. 5,505,533 and a continuation of our previously filed patent application titled HIGH PERFORMANCE MASS STORAGE SUBSYSTEM, filed Aug. 24, 1994 and given Ser. No. 08/295,280.

BACKGROUND OF THE INVENTION

1. Field of the Invention

This invention relates to the field of computer peripheral enclosures. More particularly, it pertains to a mass storage subsystem using interlocking modular stackability.

2. Description of the Prior Art

The growth rate in computer usage has been tremendous. There appears no end in sight and growth should continue at its astounding rate. In response thereto, work station performance has doubled each year for at least the last decade. Device capacity and transfer rates have also doubled approximately each year over the same period of time. Unfortunately, mass storage enclosures have not kept pace.

It has become common to use more than one peripheral, such as a disk drive, than that which is provided with the personal computer or work station. It is also common to employ DAT drives, disk drives and CDs with the computer. At present, these devices are purchased individually and require interconnection with the computer through elongated multiconductor cables having multipin connectors located at each end. These are SCSI or "scuzzy" cables. The utilization of these plug-in type units, in their individual form, has caused many problems.

The individual units are not built for physical strength so that they cannot be stacked but must be placed individually on a desk top. Employment of three or more such units causes a general cluttering about the desk top. As this "foot print" becomes enlarged, the work space on the desk top shrinks to the point where the units must be stacked one on top of another to save desk top space.

Even if they are stacked, the SCSI cables become twisted and tangled, giving rise to impedance and noise problems. This can result in unpredictable and random errors that can both crash the entire system and/or corrupt data. The units are generally connected in series which causes substantial drain on the computer power supply, to serve the separate power supplies, and which tends to create voltage fluctuations in the units and possible degradation in computer functions. While these units may remain cool using their own internal cooling fans, interconnecting the units with a computer often increases the workload on the individual unit giving rise to heat problems. Modern designs in computer peripherals stress minimized silhouetting which reduces the internal volume of the peripheral and degrades air cooling. As the cables tangle, heat problems and other difficulties continue without relief and the efficient use of peripherals is degraded.

With present interconnected peripherals, the extraction of one peripheral from the stack requires shut-down of the entire computer system and realignment of the remaining units. This causes significant down time and introduces a serious potential for lost data.

SUMMARY OF THE INVENTION

This invention is a high performance, mass storage, subsystem utilizing peripheral containment sleds for housing computer peripherals and a subsystem comprising stackable, interlocking, modular peripheral containment enclosures for joining the sled-mounted peripherals together in unique and efficient geometries. The novel sleds house the peripherals, such as DAT units and floppy disk drives, in a strong, well-ventilated containment sled that is easily and safely insertable into containment enclosures that isolate the peripherals with their own separate power supply and a novel exhaust air cooling system to produce an extremely handleable and reliable unit.

The SCSI cables are replaced in large part by printed circuit boards to reduce the impedance and noise problems virtually to extinction. The containment enclosures are stackable, both horizontally and vertically, into a multitude of closely-spaced peripherals having an extremely small desk-top foot print, while at the same time, being contained in a physically strong structure having expanded cooling facilities that allow the individual peripherals to be loaded to their maximum potential.

The stackable units are interlockable through a novel latching system that eliminates the need for screws and screwdrivers. The latching system utilizes finger tip control. The stackable units may be set in horizontal or vertical arrangement, on a flat desk surface, and the unique interconnection establishes a controlled space between the desk surface and the closest wall of the enclosure to insure a free path for air to pass during its cooling activity. With this novel stacking arrangement, one or more peripherals may be disconnected from the stack without interfering with the on-going transactions taking place within the computer. This "hot disk" removability saves significant down time on the computer.

Each sled contains its own power supply thereby reducing strain on the computer power supply and eliminating the potential for lost or damaged data due to voltage fluctuation. The overall mass storage subsystem is presented as a clean and neat industrial design bringing order to an otherwise chaotic practice. Unique jumpers, using short SCSI and power cables are used to interconnect the various enclosures. As an option, a sled may contain a LCD along with a keypad for target ID setting, device power on/off, status and diagnostic messages. A unique feature of this invention is that the LCD and keypad may be rotated to accommodate horizontal as well as vertical stacking to retain the readouts in easily readable, vertical format.

A novel insertion device is incorporated in the sled to allow it to be brought into controlled electrical connection with the internal electronics of the enclosure. Without this device, the tendency to ram the sled home in the enclosure would present significant potential for damage to the pins of the interconnecting multi-pin connector. Utilizing this unique insertion device prevents anything other than controlled interconnection between the connectors so as to prolong the useful life of the sled.

Accordingly, the main object of this invention is a high-performance, mass storage, subsystem that provides controlled stackability of computer peripherals in a manner that maximizes their individual potential and minimizes the problems presently encountered with interconnection of these peripherals. Other objects of the invention include a mass storage subsystem that is useful with rackmounted enclosures for work stations and servers; a storage subsystem that enhances the usability of various peripherals for computer work stations; a subsystem that incorporates interlocking modular stackability, in both horizontal and vertical arrangements, to decrease the overall footprint of the stacked peripherals while maximizing the utilization thereof; a subsystem that eliminates tangles from SCSI cables and the impedance and heating problems associated therewith by using extremely short-length external SCSI and AC jumpers whose bends are controlled into neat, geometric curves; a peripheral enclosure utilizing a front-panel LCD and keypad for status and diagnostic messages that may be rotated to remain upright when the peripherals are stacked either horizontally or vertically; a mass storage subsystem from which various peripherals and power supplies may be removed by "hot disk" state-of-the-art electronic processes to increase computer time and reduce down time; a mass storage system that integrates extra disk and tape subsystems into a computer work station for increasing the capacity thereof; a mass storage subsystem utilizing internal printed circuit cards and external jumpers in substitution for presently utilized elongated SCSI cables for both data transfer and power transfer; a subsystem utilizing an exhaust air-cooling system that insures the units to be operated within factory tolerances; a mass storage subsystem that is modular in concept and easily expandable wherein the stacking is done without the need for screws and other threaded devices; and a storage subsystem that insures the peripherals are maintained above the plane of whatever surface they are placed upon.

These and other objects of the invention will become more apparent when reading the following Description of the Preferred Embodiment taken together with the drawings appended hereto. The scope of protection sought by the inventors may be gleaned from a fair reading of the Claims that conclude this Specification.

DESCRIPTION OF THE DRAWINGS

FIG. 3 is an illustrative view of a modular power supply that is insertable in a sled that will become part of a stackable subsystem;

FIG. 3a is an illustrative of the rear of the modular power supply shown in FIG. 3;

FIGS. 4, 4a, 4b and 4c are illustrative views of the handle swinging between first and second position when inserting a peripheral sled into an enclosure;

FIG. 5 is an illustrative view of a plurality of peripheral enclosures stacked horizontally together;

DESCRIPTION OF THE PREFERRED EMBODIMENT

Figure 1:
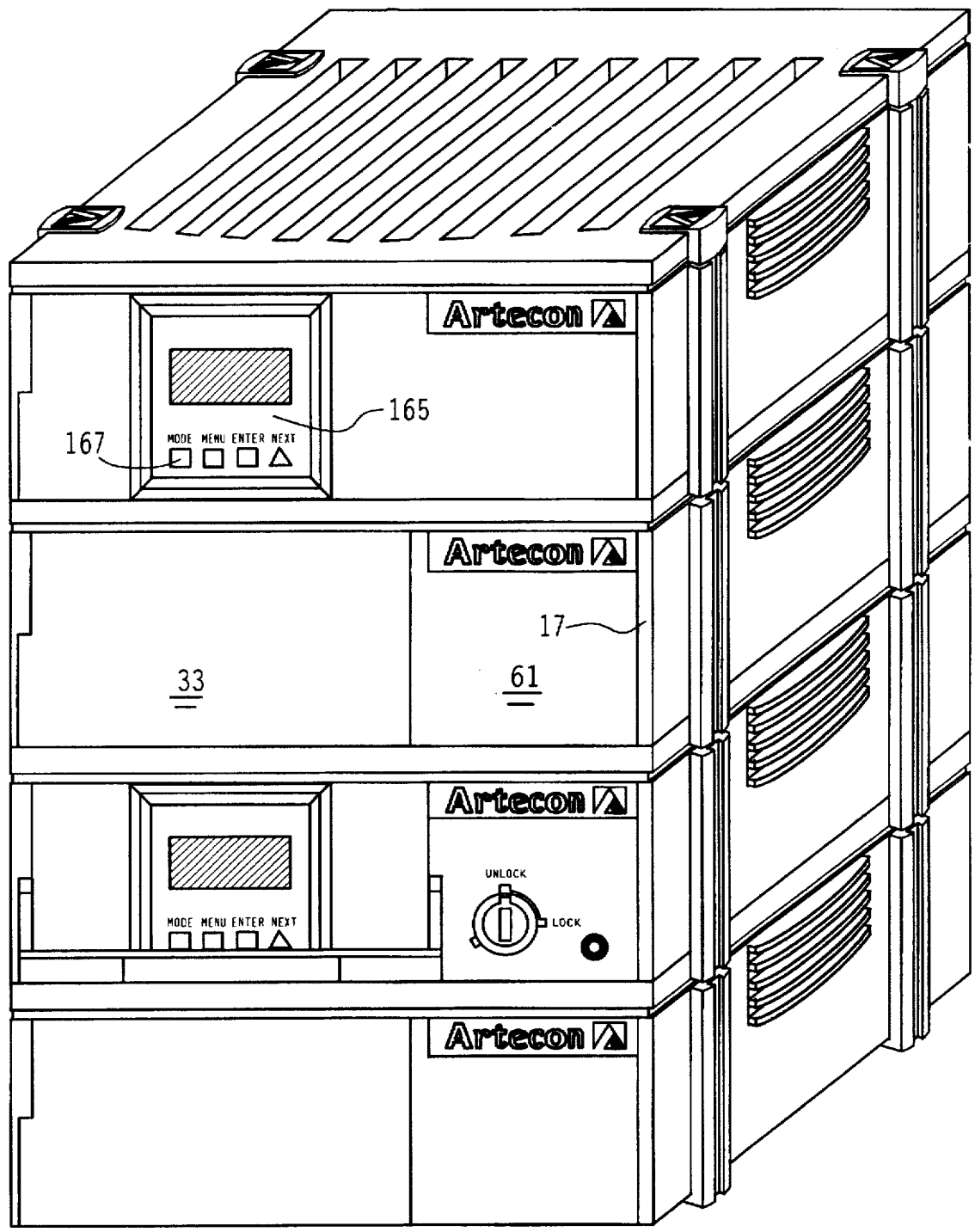
FIG. 1 is an illustrative view of a plurality of peripheral enclosures stacked horizontally together.
Figure 2:
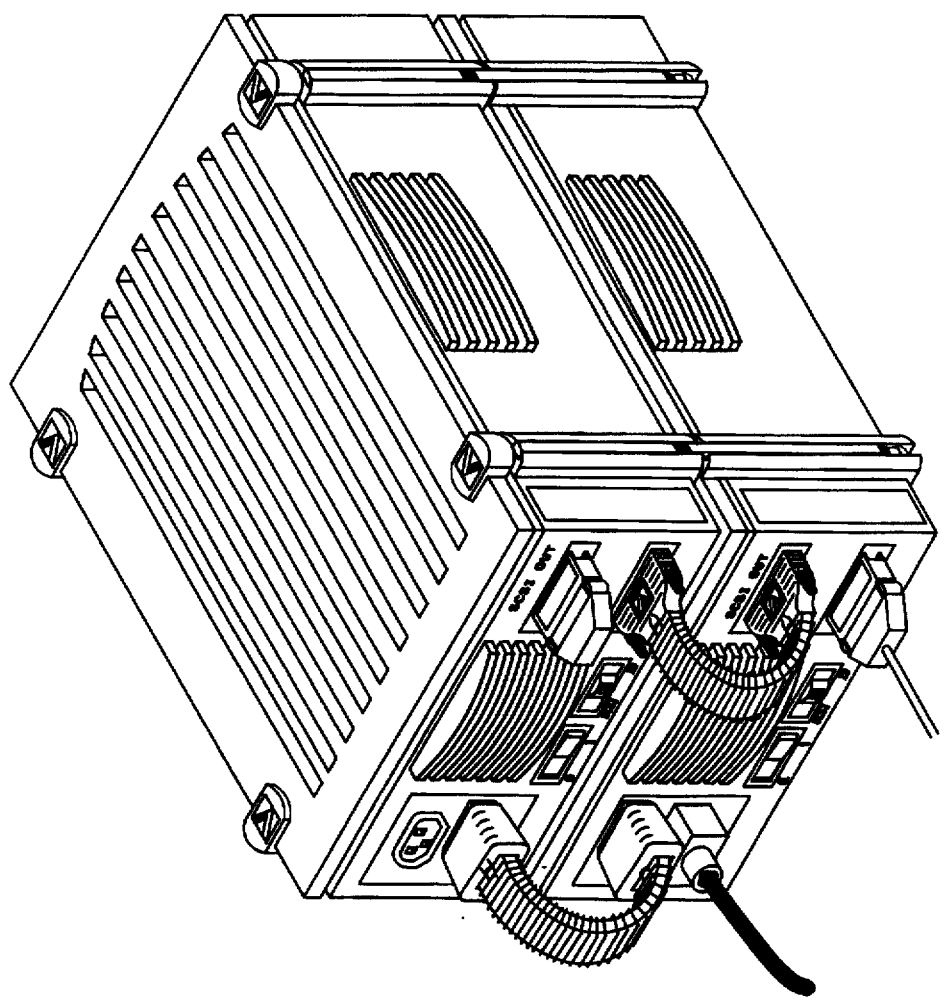
FIG. 2 is an illustrative view of the rear of a pair of enclosures stacked together in a subsystem showing the use of AC and SCSI jumpers to replace cables.
Figure 13A:
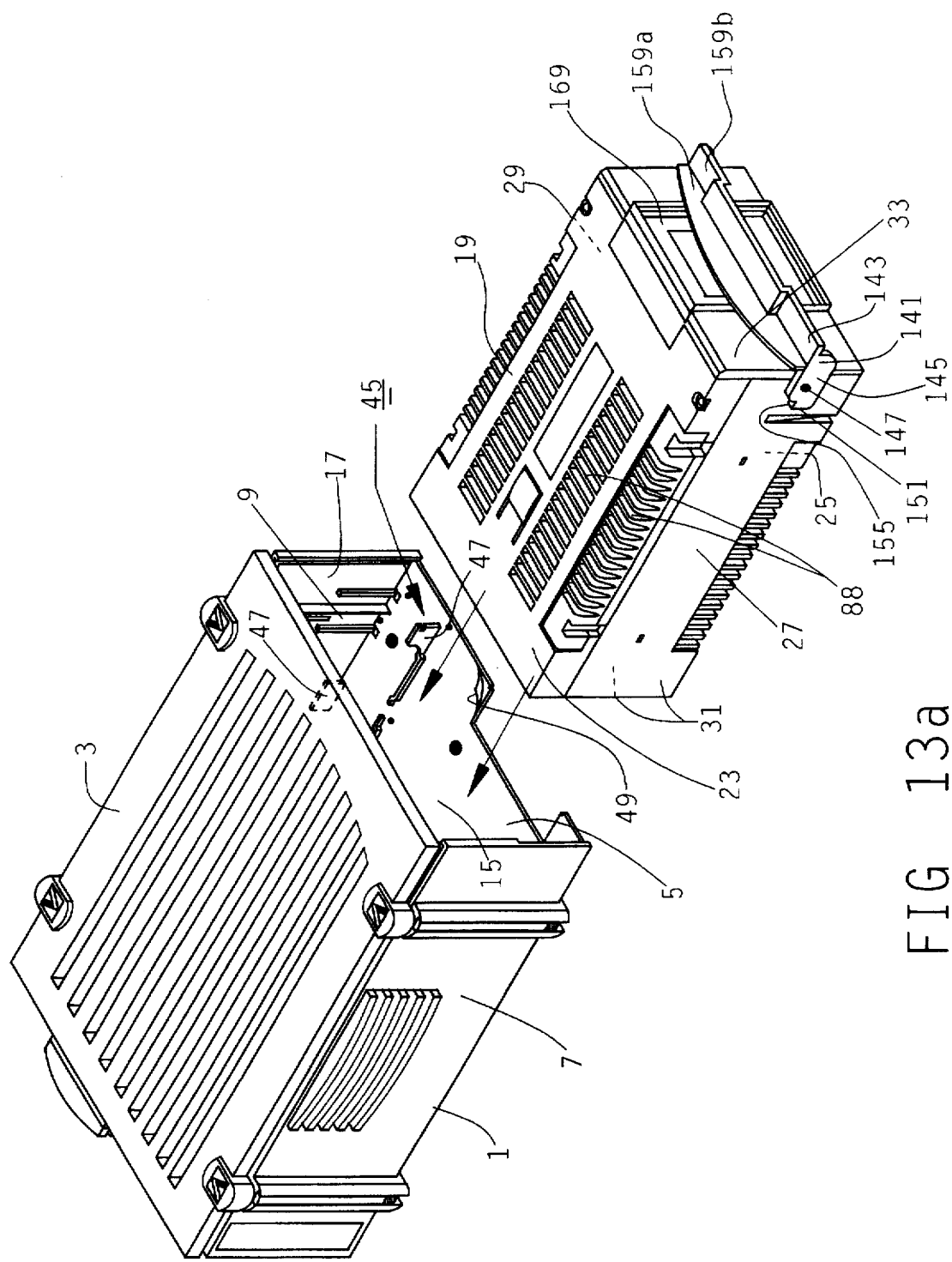
FIG. 13a is an illustrative view of the rear of the sled shown in FIG. 13.
Figure 13B:
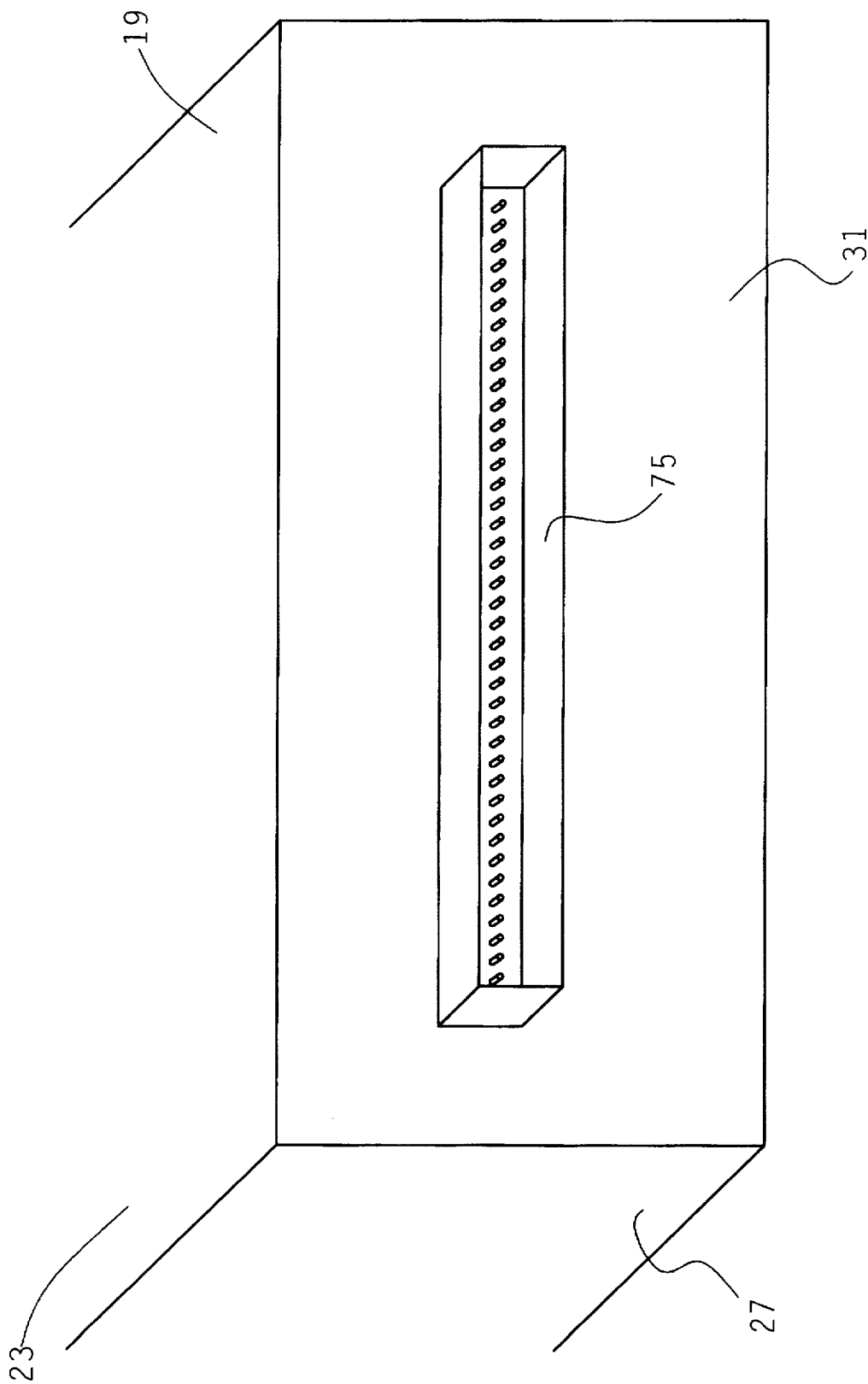
FIG. 13 is an illustrative view of a sled being aligned for insertion into an enclosure.
Figure 14:
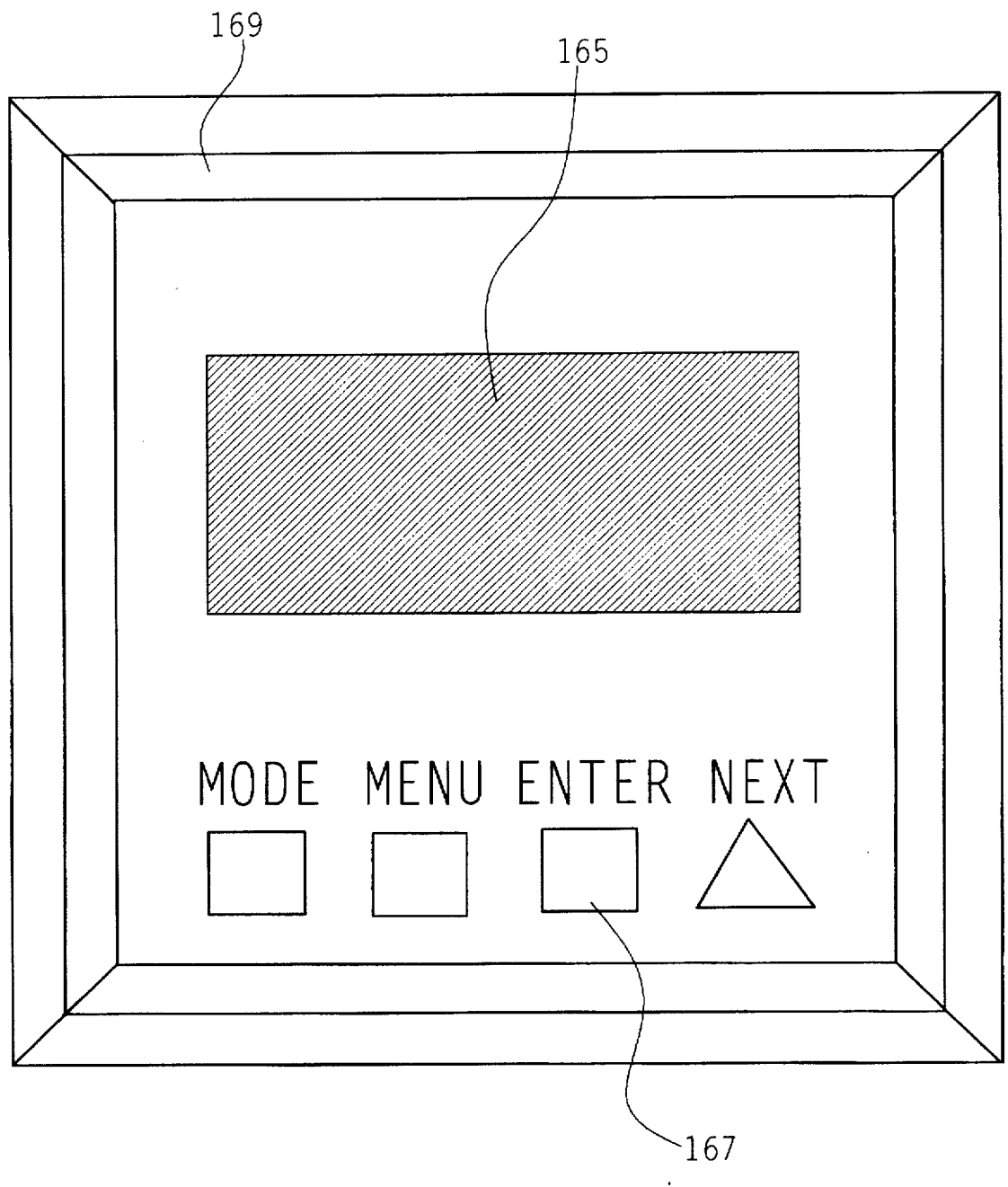
FIG. 14 is a front plan view of the LCD and keypad that is associated with the peripheral sled.

Turning now to the drawings wherein like elements are identified with like numerals throughout the twenty-five figures, the computer subsystem of this invention is shown in FIGS. 1 and 13 to comprise an enclosure 1 formed by broad top and bottom flat walls 3 and 5, respectively, preferably in the size of 6.75 inches wide and 10.75 inches long, held in spaced-apart arrangement by opposed shorter side walls 7 and 9, preferably 2.6 inches high and as long as top and bottom walls 3 and 5, and a rear wall 11 (see FIG. 10) that are all joined along their respective marginal edges 13 to form an enclosure cavity 15 inside said enclosure that is accessible through a front opening 17 that is formed about its periphery by the front edges of top and bottom walls 3 and 5 and side walls 7 and 9. Cavity 15 may be designed to receive therein an optional peripheral containment sled 19 (see FIG. 13a) and a power supply 21. Enclosure 1 is preferably made of injection moldable plastic parts so that it is lightweight, yet strong enough to support a plurality of enclosures in vertically stacked arrangement.

Peripheral containment sled 19 is shown in FIG. 13a to comprise broad top and bottom walls 23 and 25, respectively, that are held in spaced-apart arrangement by opposed side walls 27 and 29, a rear wall 31 and a front wall 33, all of said walls joined along their respective marginal edges 35 to form a sled cavity 37 for receipt of a computer peripheral, such as a 4mm DAT or a floppy drive unit, and an elongated power supply 21. More will be said about the peripheral sled 19 later in this description.

A means 45 is provided in enclosure 1 extending rearward from front opening 17 interior of cavity 15 toward rear wall 11 for receiving therealong enclosed sled 19 in controlled alignment. As shown in FIG. 13, means 45 preferably comprises a narrow curbing 47 extending interior cavity 15 and raised upward out of bottom wall 5 a short distance, such as ¼ to ½ inch, to confine the path of movement of sled 19 as it is moved into and out of cavity 15. Narrow curbing 47 may also be extended downward from the interior of top enclosure wall 3 the same or a similar distance to aid in controlling the position of sled 19 in cavity 15. In addition, another curbing 47 may be conveniently placed on the floor of bottom wall 3 adjacent side wall 7 to help confine peripheral sled 19 to one side of cavity 15.

It is preferred that a radiation shield 49, in the form of a foil or similar radiation shield material, be placed inside cavity 15 to completely surround the interior surfaces of top and bottom walls 3 and 5, side walls 7 and 9 and rear wall 11 to reduce the emission of electronic radiation from the enclosure when the peripheral is in use.

As shown in FIG. 3, elongated power supply 21 comprises elongated top and bottom, narrow walls 53 and 55, respectively, held in spaced-apart relation by spaced-apart side walls 57 and 59, and terminated by a front wall 61 and a rear wall 63, so as to form an elongated, rectangular enclosure having a height designed to fit closely between top and bottom enclosure walls 3 and 5. Top, bottom and side walls 53 through 59, are preferably made of metal to aid in reducing electronic emissions and in bringing heat, generated in said power supply, out to the surface for ease in cooling.

Figure 8:
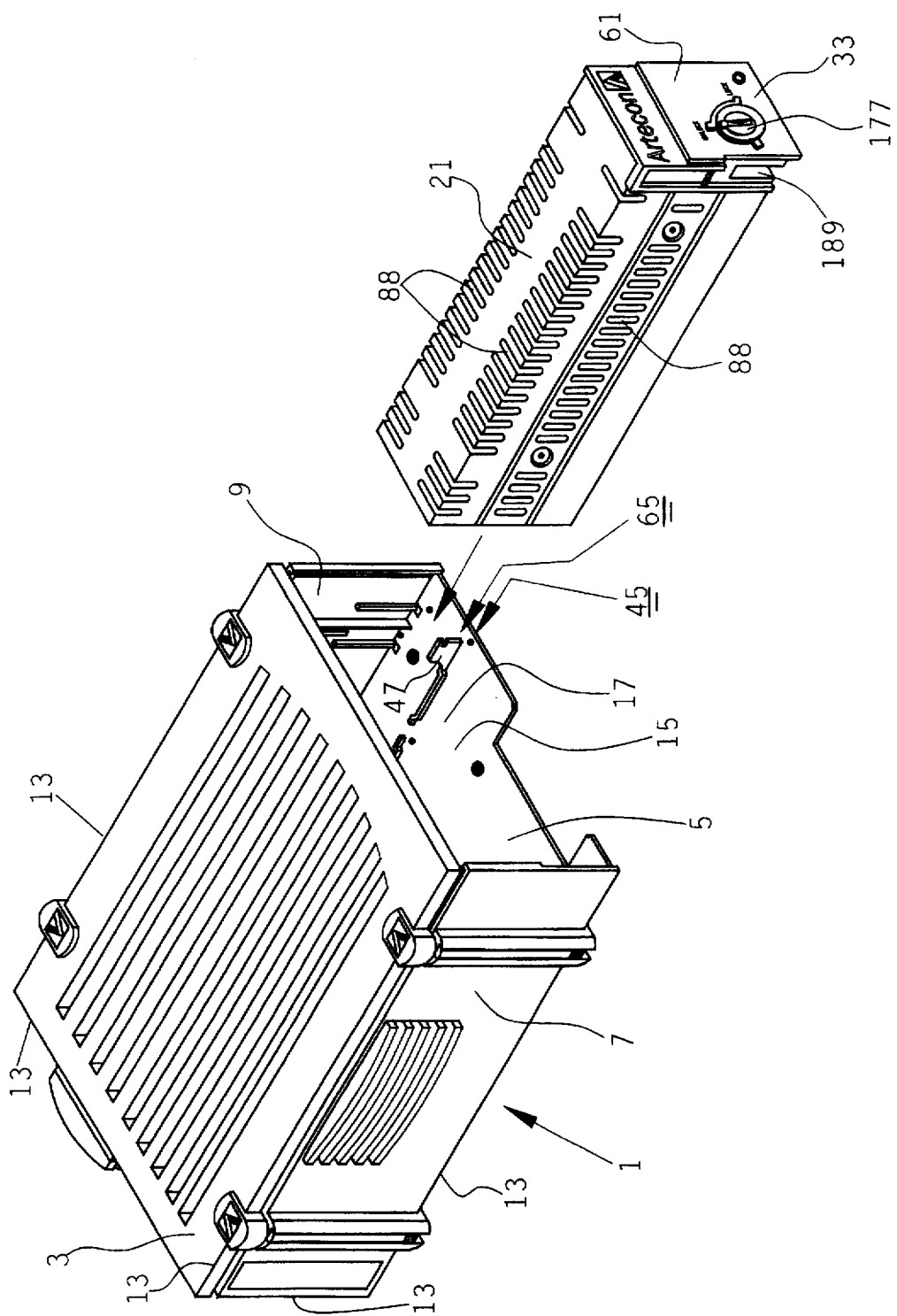
FIG. 8 is an illustrative view showing how a power supply is inserted into a peripheral enclosure.

A means 65 is shown in FIG. 8 and is provided adjacent and aligned with means 45 and also extends rearward from said front opening 17 interior cavity 15 for receiving therealong power supply 21 in modular form to provide power to the peripheral contained in the specific sled 19 inserted in cavity 15. As shown in FIGS. 8 and 13, it is preferred that sled 19 and power supply 21 be positioned in cavity 15 in side-by-side arrangement. In this preferred arrangement, means 45 and means 65 take the form of a common curb 47 between the sled and the power supply to hold both items in controlled alignment. However, it is within the spirit and scope of this invention to have means 45 and means 65 positioned independent of one another to separately maintain alignment of these items in cavity 15. These separate means may extend upward from the floor of cavity 15 or downward from top wall 3, or they may be a combination of both.

As shown in FIG. 1, front wall 33 of sled 19 and front wall 61 of power supply 21 are designed to be aligned flush with front opening 17 of enclosure 1 when these items are fully seated in cavity 15. This provides for a convenient, efficient and aesthetically pleasing design to have the peripheral and its own power supply aligned in side-by-side arrangement within one sled. This allows enclosures 1 to be stacked in multiple arrangement as will more clearly be described.

Figure 16:
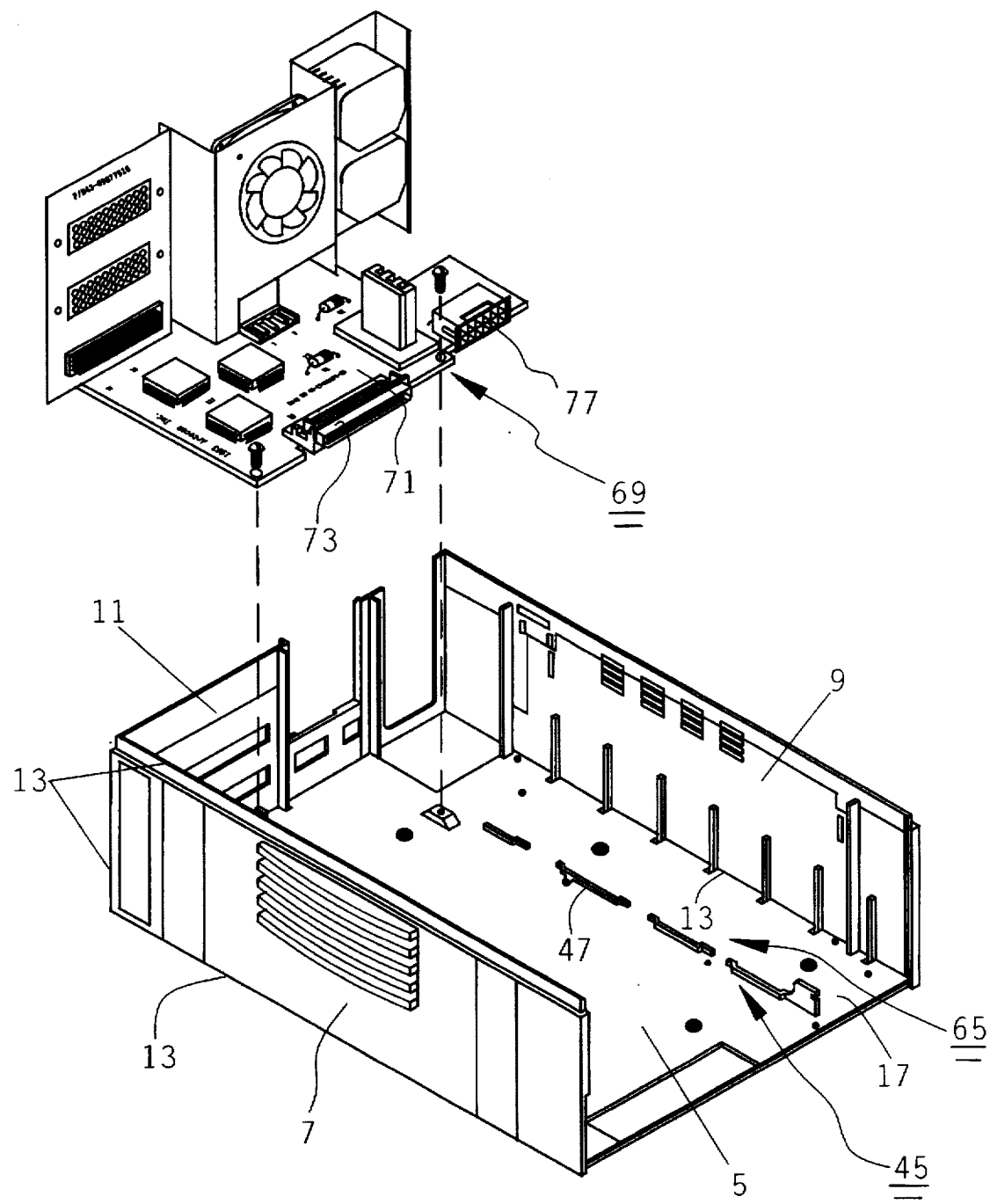
FIG. 16 is a isometric view showing the internal printed circuit card technology in place of internal cables.

As shown in FIG. 16, a means 69 is provided in cavity 15 of enclosure 1 for interconnecting the peripheral, housed in sled 19, and power supply 21 interior enclosure 1. The preferred embodiment of means 69 is a printed circuit board 71 mounted across cavity 15 near rear cavity wall 11. On circuit board 71 is mounted a forwardly-facing first multipin connector 73 arranged for registered mating engagement with a similar but opposite-sexed (connectable) multipin connector 75 located on sled rear wall 31 and facing aft or outward therefrom (see FIG. 3a). A second forwardly-facing multipin connector 77 is mounted on printed circuit board 71 and arranged for registered mating engagement with a similar, connectable multipin connector 79 located on rear power supply wall 63, and facing aft or outward therefrom. It is preferred that first connector 73 and its counterpart 75 are SCSI multipin connectors such as the 80-pin "one-connector" advocated by certain computer groups such as Seagate and Sun Microsystems. Said first and second multipin connectors are interconnected through circuitry contained in printed circuit board 71 to eliminate, almost entirely, the need for SCSI connecting cables that heretofore have become a tangled mass and created heating and impedance problems.

Figure 7:
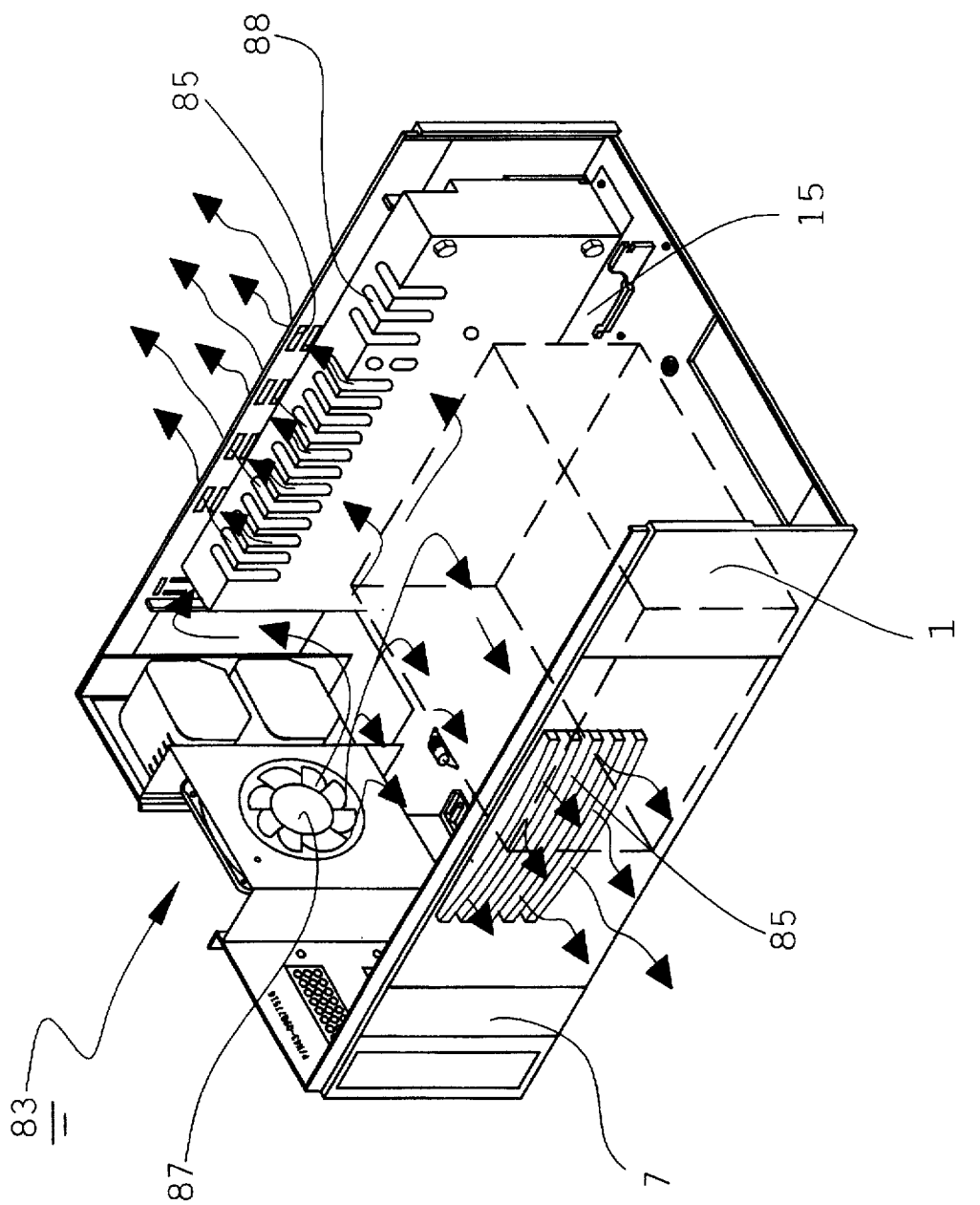
FIG. 7 is an illustrative view of a typical air-flow pattern in a peripheral enclosure.
Figure 11:
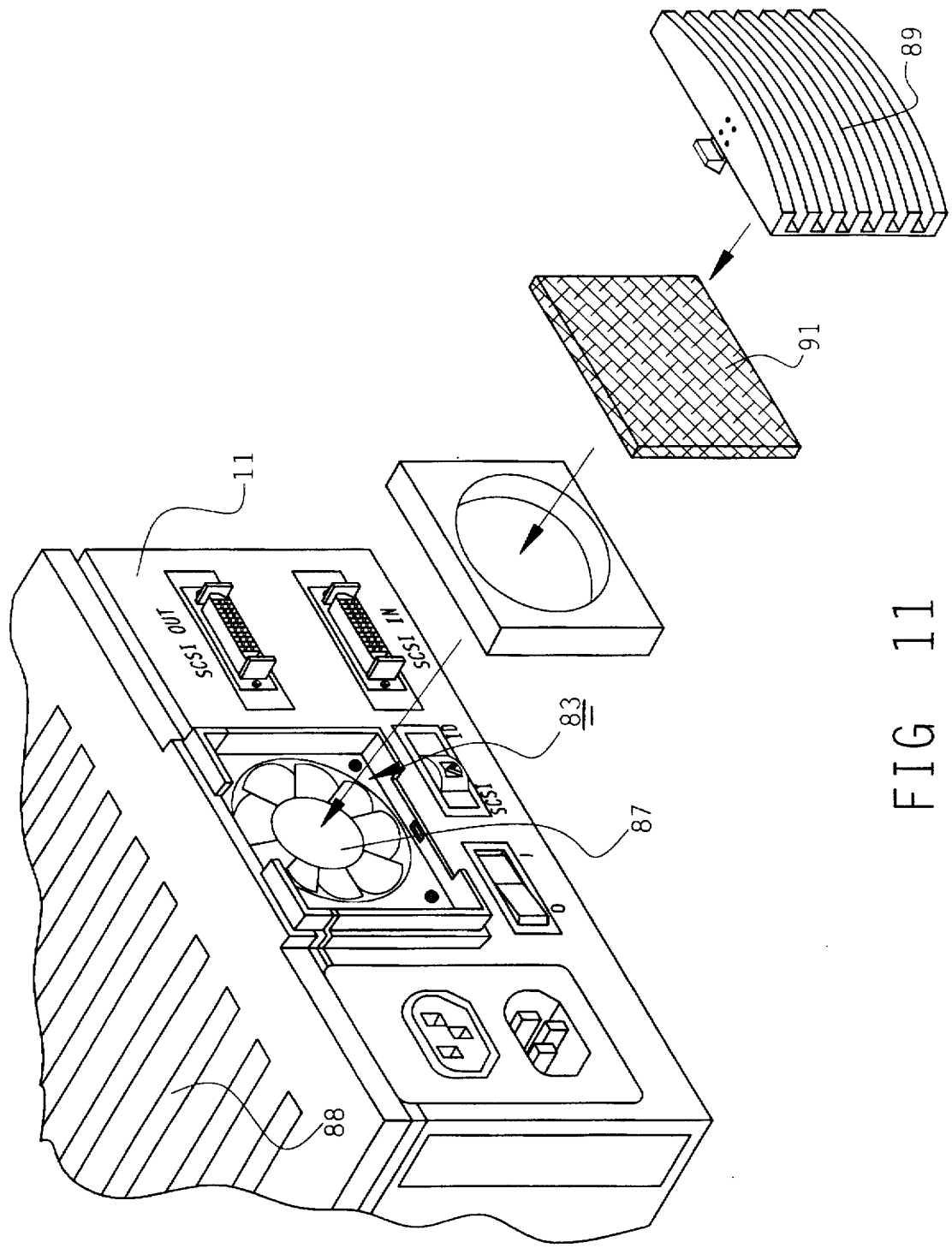
FIG. 11 is an illustrative view of a typical rear wall of an enclosure showing the various parts of the cooling means.
Figure 12:
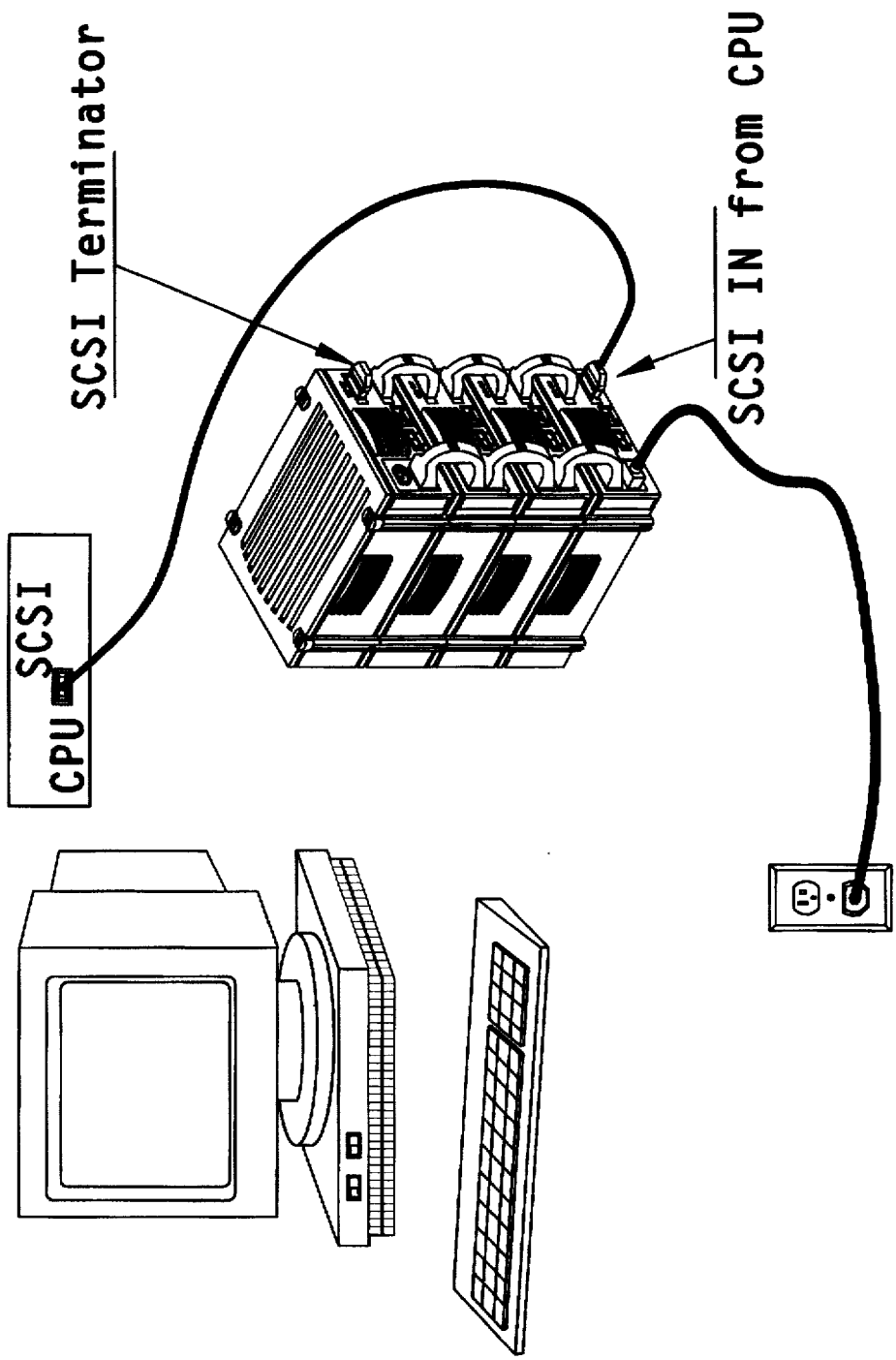
FIG. 12 is an illustrative view showing four enclosures in vertical, stacked arrangement and their interconnection and connection to other computer hardware.

As shown in FIGS. 7 and 11, means 83 is provided in enclosure 1 for air cooling all of the heat generating elements contained within the enclosure. Means 83 comprises at least one, but preferably a series, of slotted apertures 85 formed in the upper part of enclosure side walls 7 and preferably spanning approximately one-third the length of enclosure 1. In addition, means 83 includes a powerful air fan 87 located inside enclosure rear wall 11, preferably centrally thereof, and adjacent a series of slotted apertures 89 formed in enclosure rear wall 11. Air is drawn by fan 87 in through said apertures 89 and out through the fan assembly. It is preferred that both sled 19 and the walls of power supply 21 be heavily fenestrated with numerous slots and other apertures so that the powerful draft of air drawn out of cavity 15 by fan 87 is forced about all areas of the peripherals contained in sled 19 and the interior of power supply 21 to carry the heat generated therein out thereof and retain these components and the power supply within their temperature-tolerant levels. This is especially important when power supply 21 is an autosensing power supply; this is the preferred type of power supply for use in this invention. This "suction-type" cooling insures that cooling air is passed by all areas of the peripheral and the power supply, to eliminate hot spots therein.

Figure 10:
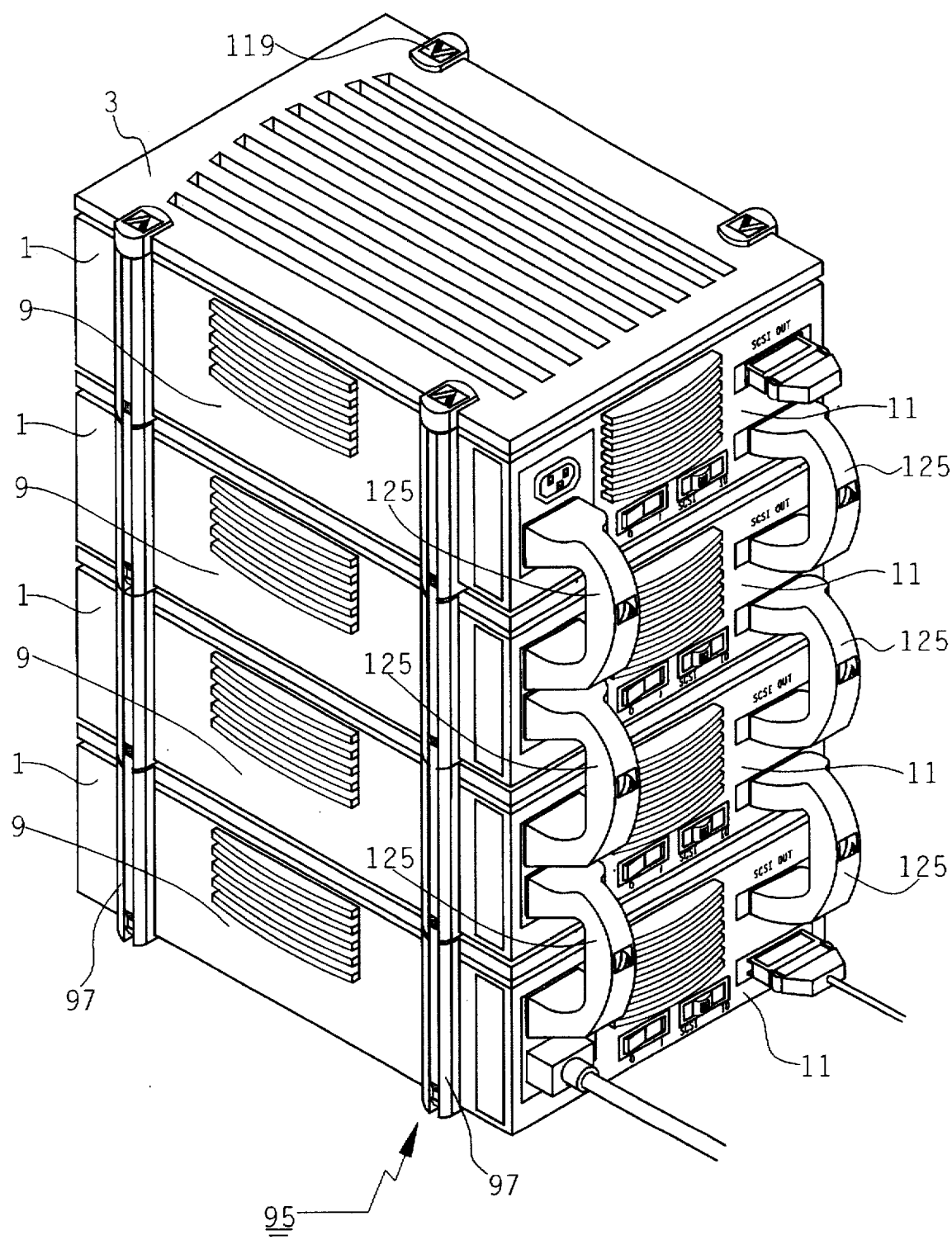
FIG. 10 is an illustrative view of a portion of a stack of enclosures showing the means for interconnecting the enclosures.
Figure 10A:
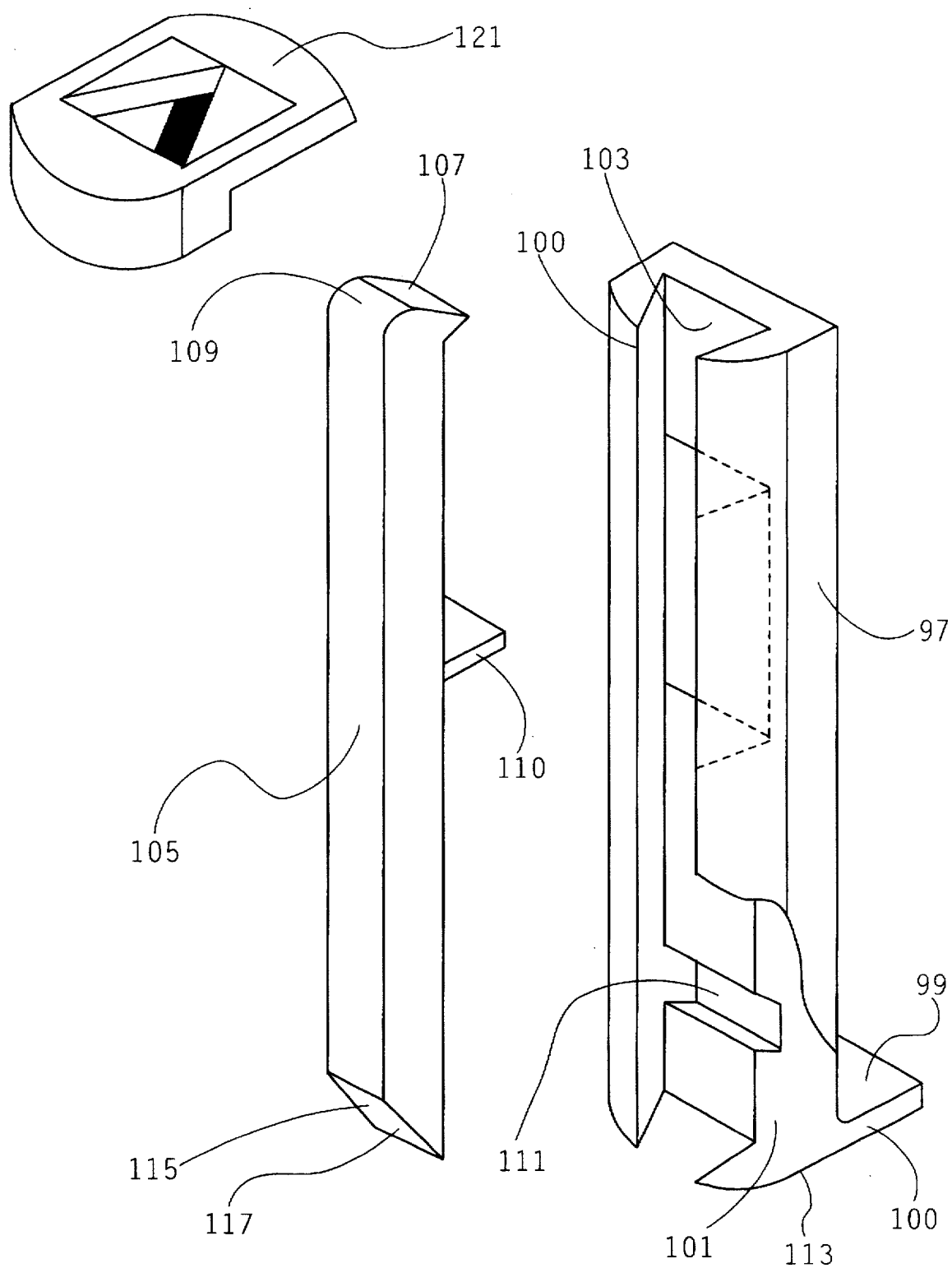
FIG. 10a is an illustrative view of the latching mechanism that holds a plurality of stacked enclosures in interlocked connection.

As shown in FIGS. 10 and 10a, a means 95 is provided for interconnecting a plurality of enclosures 1, either horizontally or vertically, to create a small foot print on whatever surface the interconnected enclosures are positioned. The vertical stack is shown in FIGS. 1 and 10 while the horizontal stack is shown in FIG. 5. Means 95 comprises a pair of bars 97, of terminal length, in spaced-apart arrangement on the outside of enclosure side walls 7 and 9, extending from enclosure bottom wall 5 to top wall 3. A flange 99 extends inward from bar bottom end 101 along the outside of enclosure bottom wall 5. Bars 97 and flanges 99 include exterior surfaces 100 at least a portion of which are spaced-apart from enclosure side walls 7 and 9 and bottom wall 5. A channel 103 is formed axially along the outside surface of bars 97 for receipt therein of an elongated latch 105 in slideable engagement therewith. A hook 107 is formed at upper end 109 of latch 105 and arranged to rise above top enclosure wall 3 when said latch is moved to its uppermost position, against a stop 110 situated under said latch. A notch 111 is formed in lower end 113 of channel 103 for receipt therein of a hook 107 extending upward from a latch 105 carried in a bar 97 of another enclosure 1 positioned therebelow. To interlock two or more enclosures, said enclosures are set one atop another, in aligned arrangement, so that bars 97 of one are aligned with bars 97 of the other enclosure as shown in FIGS. 1 and 10. Latch 105 from the lower enclosure is moved upward, by finger pressure, in its channel 103 until hook 107, at the top of said latch, rises to the next set of bars 97 and engages notch 111 at the lower end of the upper bar. A ramped depression 115 is formed in the lower part of latch 105 and contains a surface irregularity, such as molded dimples 117, to aid the user in sliding latch 105 upward to engage hook 107 with notch 111. A small depression 119 is formed in top enclosure wall 3 and bars 97 are offset downward the depth of said depression. Flange 99 therefore may be easily made in monolithic form with the bottom end of bar 97 and extend inward over bottom wall 5 as shown. A plurality of small, elastomeric pads 121 are provided, one in each depression 119, to provide vibration isolation to each enclosure and to insure separation of the bottom wall of one enclosure from the top wall of a lower, interconnected enclosure.

Bars 97 and latches 105 extend outward from the surfaces of enclosure 1 along sidewalls 7 and 9. This means that interconnected enclosures may be stacked vertically or stacked horizontally. When stacked vertically, elastomeric pads 121 set the bottom enclosure above the resting surface to isolate vibration from the peripheral and the cooling air fan. When set on their sides, the elastomeric nature of bars 97 also provide both separation of side walls 7 and 9 from the resting surface but isolate the vibration created inside the enclosure from the surface on which the interlocked enclosures are positioned. In either arrangement, the foot print of the interconnected enclosures is maintained at a minimum to allow the user to have the maximum amount of desk top space for use with other aspects of his/her project.

The stacked enclosures are shown interconnected through one or more jumpers 125. These jumpers are short in length and do not intertangle. They reduce impedance and noise problems to virtual elimination. As shown in FIGS. 2, 10, 12, 17b and 18, two kinds of jumpers are utilized in this invention, both having similar characteristics, and are provided in two kinds of designs. Jumpers 125 are comprised of a short length of multiple conductor wires 127. Over said wire is an elastomeric covering 129. A plurality of closely spaced, plate-like ribs 131 are formed in covering 129 extending outward therefrom about the entire circumference of wire 127 and along the length thereof. It is preferred that wire 127 and its covering 129 are made wider than thick so that the cross section of jumpers 125 take on a rectangular shape. A pair of plugs 133 terminates the ends of jumpers 125. As shown in FIG. 10, a jumper containing two multipin SCSI plugs are used to interconnect the data ports of two interconnected enclosures. The connectable counterpart plugs or receptacles, to which the SCSI male plugs are attached, are located in enclosure rear wall 11 and are arranged to face outward, one above the other, so that jumper 125 interconnects the plugs in vertical arrangement. As with most SCSI plugs, a pair of widely-spaced screws 135 is provided for threadable seating into counterpart threaded bores in rear enclosure wall 11 to retain the plugs in place.

Figure 17A:
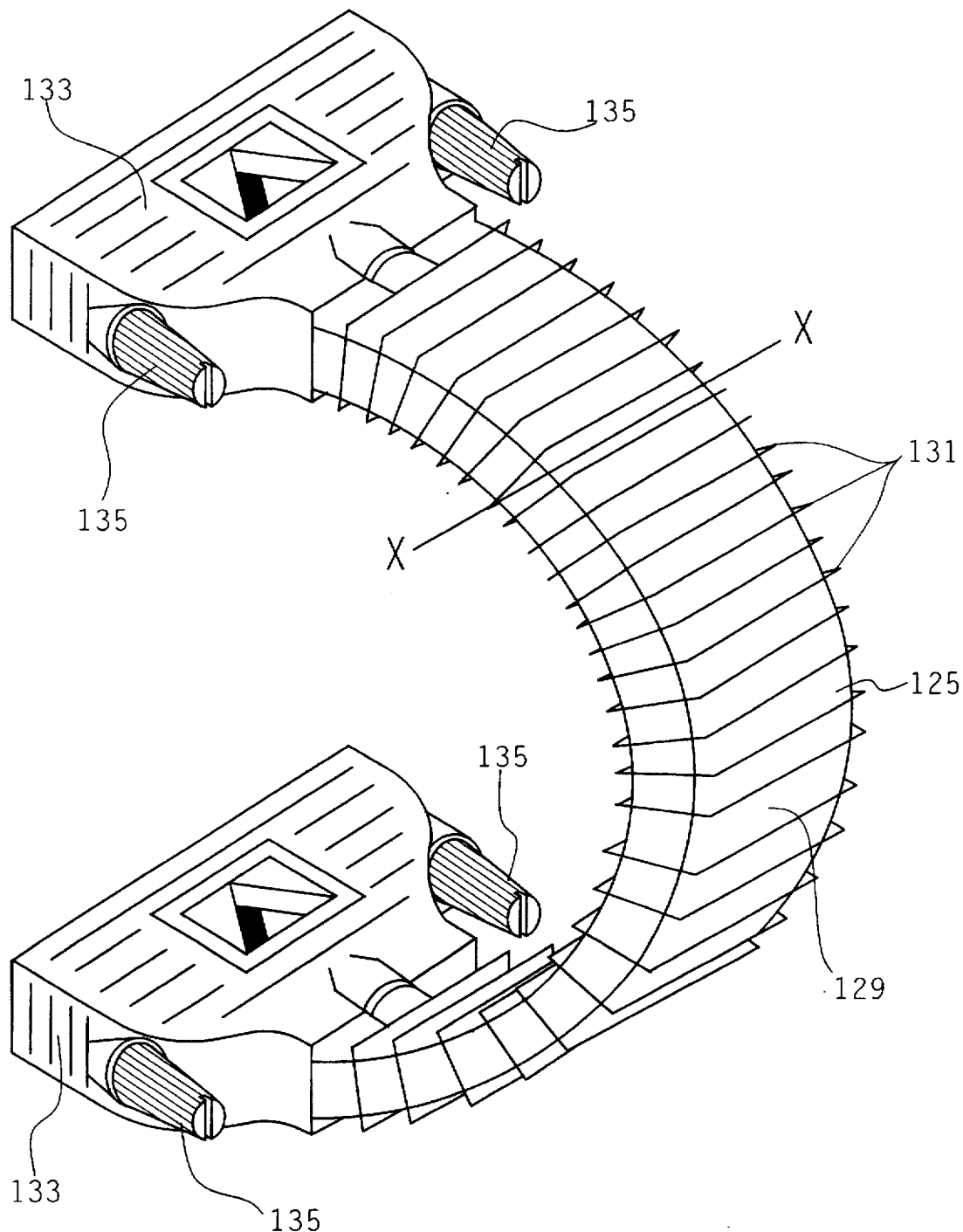
FIGS. 17a and 17b are illustrative views of the two types of SCSI jumper cables used in this invention.
Figure 17B:
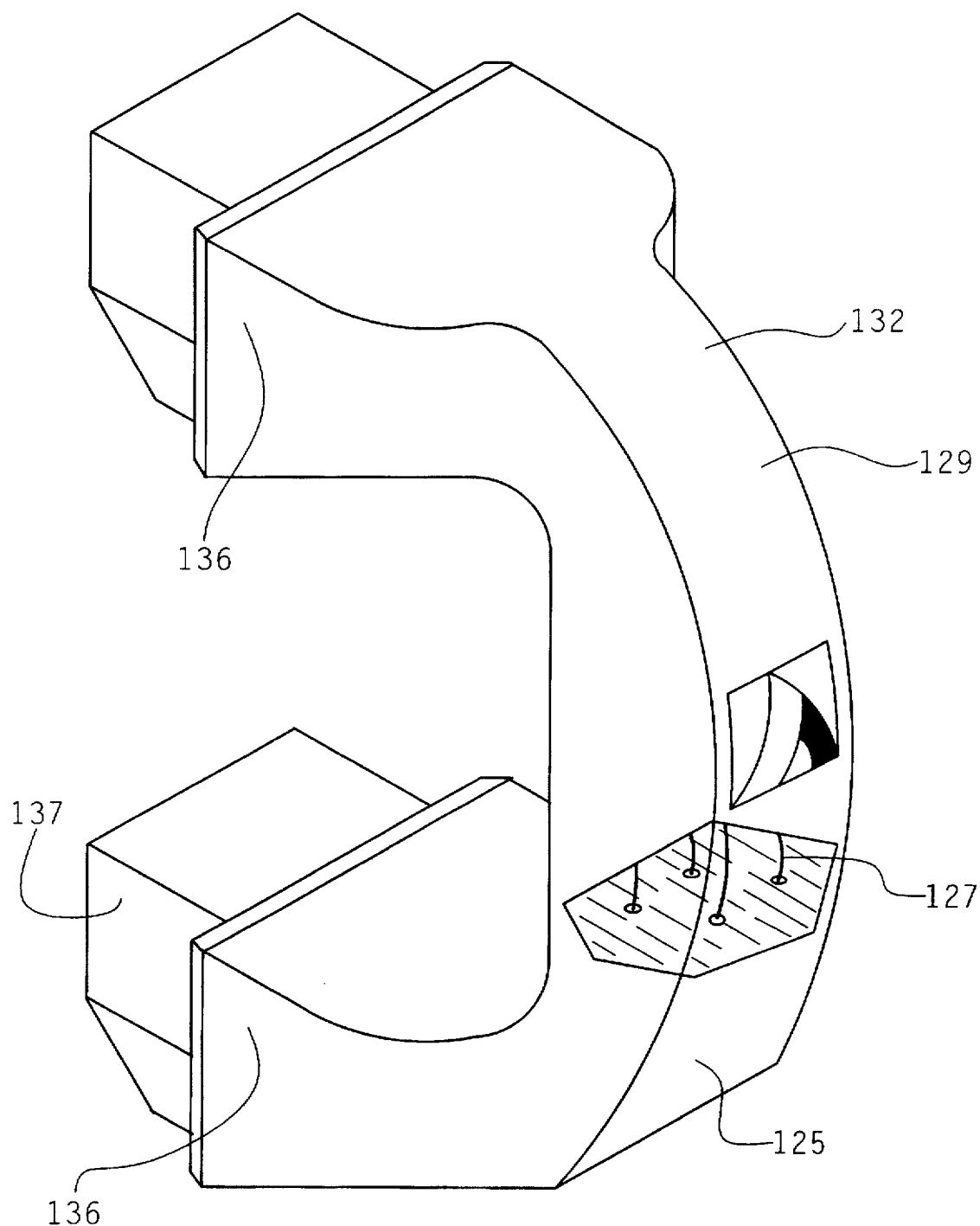
Figure 18:
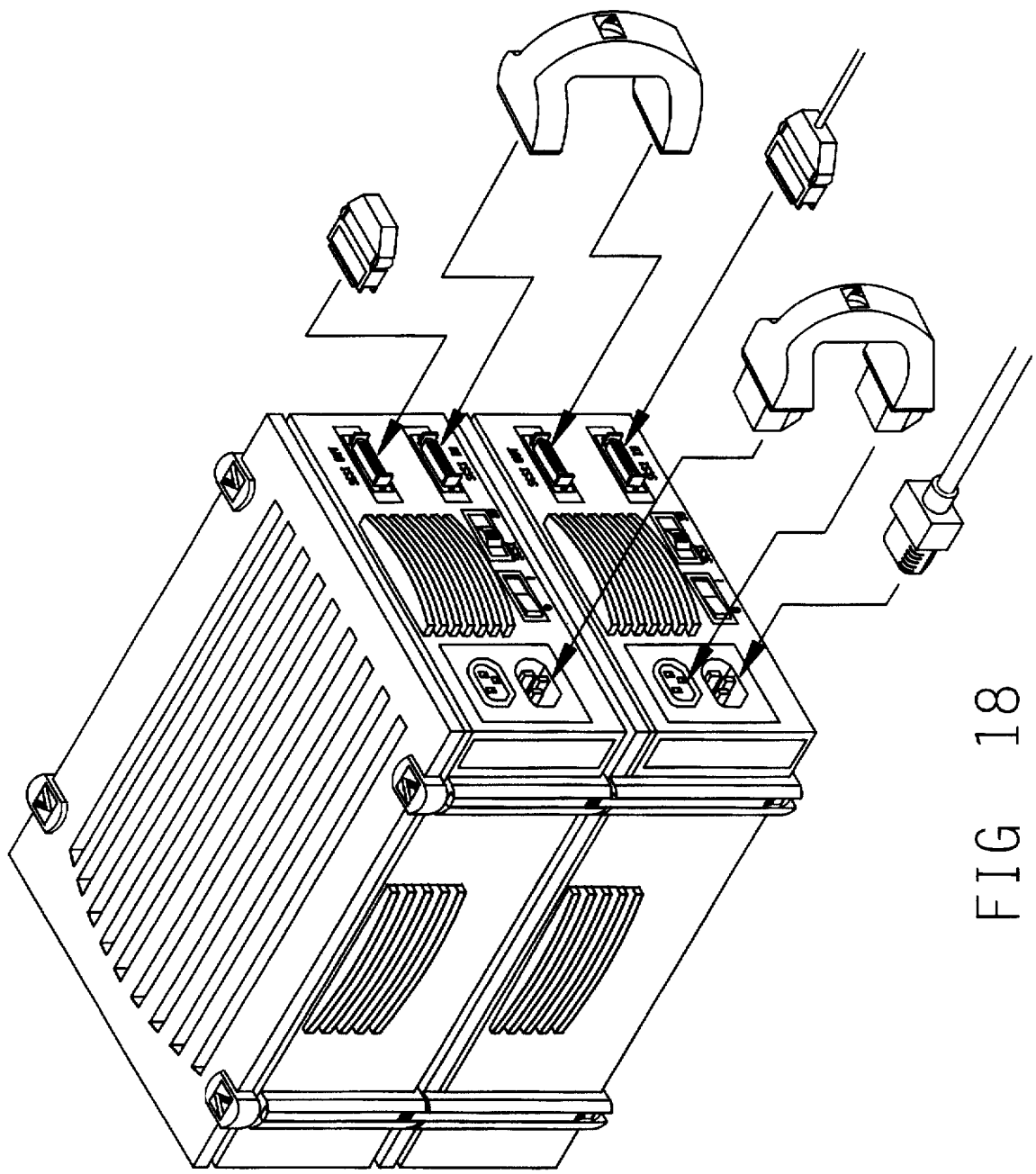
FIG. 18 is an illustrative view of a typical AC jumper cable used in this invention.

In another embodiment, shown in FIG. 17b another jumper 125 containing similar wire 127, a covering 129, and a smooth covering 132 in preferably rectangular cross section, are terminated with a pair of AC plugs 136, or more preferably one male plug and one female plug, to allow the interconnected enclosures to be plugged in series. With respect to the plug containing exposed prongs, as shown in FIG. 17b, a skirt or hood 137 is formed around the exposed prongs to help in preventing inadvertent physical contact with the user. A complementary slot (not shown) is formed inward about the female counterpart of the AC receptacle for receipt therein of skirt 137. In the case of ribs 131, it is preferred that jumpers 125 are arranged to bend about the long axis x—x of the rectangular cross-section of the ribs, as shown in FIG. 17a, so that the curves formed in wires 127 are controlled by ribs 131 into pure 180° bends.

Figure 4A:
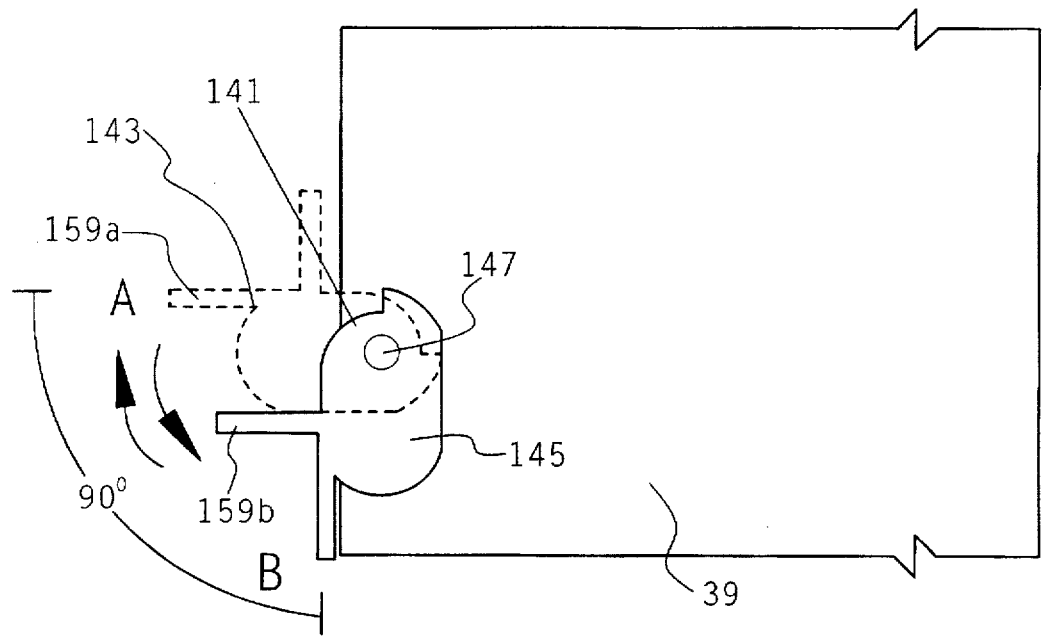
Figure 4B:
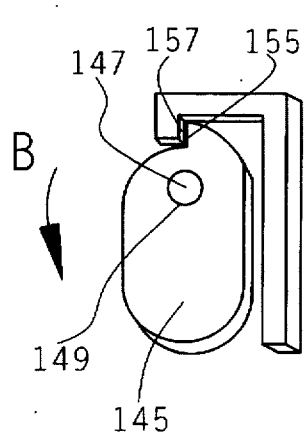
Figure 4C:
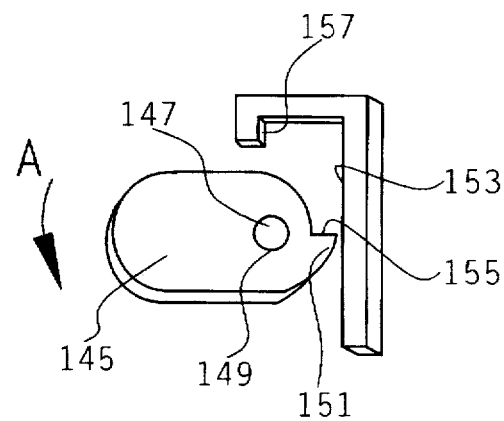

An option in this invention is for sled 19 to be able to be moved into and out of cavity 15 of enclosure 1. As shown in FIG. 13a, this option involves a locking mechanism 141 provided at front sled wall 33. FIGS. 4a, 4b and 4c show mechanism 141 to include a handle 143 that is moveable between a first position, noted as "A" in FIGS. 4a and 4c, wherein sled 39 is inserted in cavity 15 and the peripheral is ready to be interconnected therewith, and a second position, noted as "B" in FIG. 4b, wherein sled 19 is locked into enclosure 1 and the peripheral contained in said sled is electrically interconnected therewith and further, wherein the movement of handle 143 between first and second positions "A" and "B", respectively, accomplishes the act of locking sled 19 and interconnecting the peripheral.

As shown, the preferred embodiment of locking mechanism 141 shows a portion of handle 143 being of terminal length for movement through an arc of approximately 90° between first and second positions "A" and "B". A pair of handle support lugs 145 is connected to the terminal ends of handle 143 and, in turn, are pivotally mounted to sled 19 by pins 147 extending outward from the front portion of side walls 27 and 29 for receipt thereover of a pair of apertures 149 formed in lugs 145. A first camming surface 151 is formed on the rearward end of lugs 145 and arranged for abutment against a surface 153 formed in enclosure 1 near front opening 17 to retain sled 19 at a specific distance from electrical interconnection when handle 143 is in first position "A".

A second clasping surface 155 is formed on lugs 145 spaced-apart from first camming surface 151 for gradual movement into clasping contact with another locking surface 157 formed on enclosure 1 when handle 143 is moved from first position "A" to second position "B". Handle 143 is shown to have two elongated ribs 159a and 159b that are positioned at 90° to each other so that one rib is facing forward from sled 19 regardless of the position of handle 143.

The purpose of locking mechanism 141 is both to obtain positive electrical and physical interconnection between the peripheral and power supply 21 and, simultaneously therewith, insure that sled 19 may achieve this positive interconnection without damage to any of the pins in the SCSI multipin connector. Those skilled in the art realize that the pins of a SCSI multipin connector are rather fragile. Most interconnection between these connectors is accomplished very carefully so as not to bend or otherwise damage any of the pins. Should a pin be damaged, such as by fracture, that particular conductor is not interconnected down the line and therefore, the data stream that is planned for travel along that conductor will not take place. In this event, the computer function will suffer accordingly.

When sled 19 is inserted into cavity 15 and pushed inward, the two interconnectable multipin connectors located respectively on sled rear wall 31 and fixed connector 73, are prevented from interconnecting through the abutment of first camming surface 151 against surface 153 in mechanism 141. This brings the motion of sled 19 to a full stop. At this point, handle 143 is in its first position. To complete the insertion of sled 19 into cavity 15 and achieve electrical and physical interconnection between the respective SCSI connectors, handle 143 is moved downward towards its second position "B". During this travel, second clasping surface 155 formed on lugs 145 will move into clasping engagement with second clasping surface 155 and slowly draw sled 19 into final insertion in cavity 15. It is this controlled movement of sled 19 only by the movement of handle 143 that causes physical and electrical interconnection of sled 19 in cavity 15. This smooth connecting movement also prevents the individual pins of the SCSI connectors from entering into interfering motion with each other and accordingly prolongs the life and the viability of the interconnection. In addition, the use of handle 143 and software contained in PC board 71 allows a peripheral to be disconnected through movement of handle 143 and removed from its sled without shutting down the entire computer network. This is referred to as "hot disk" removability and allows additions and deletions of peripherals to the system while the system is fully functional.

Figure 6:
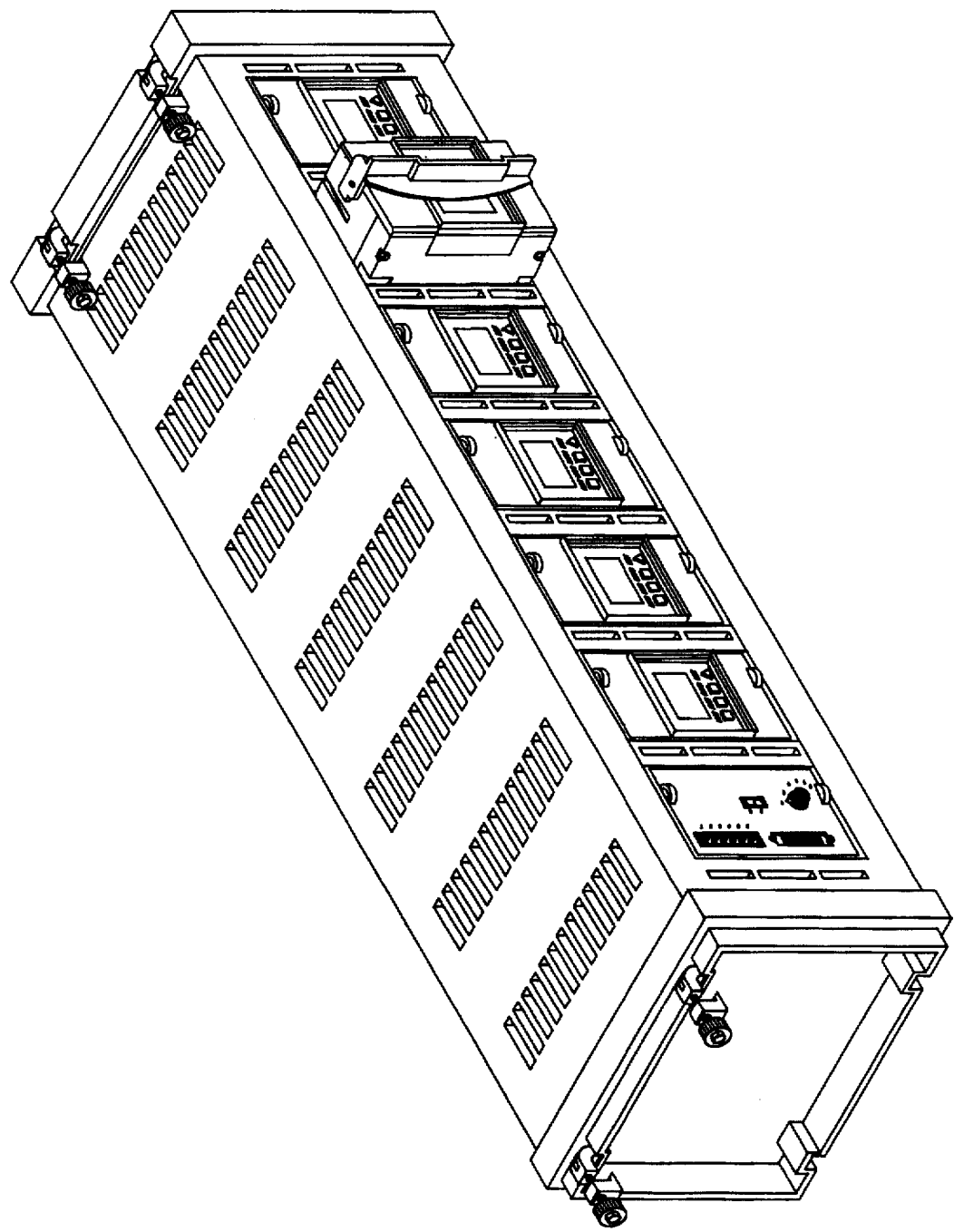
FIG. 6 is an illustrative view of a plurality of peripheral sleds shown loaded into a mass storage enclosure.

Surfaces 153 and 157 may also be formed on the forward side wall of power supply 21 so that lugs 145 lock against both one enclosure side wall 7 or 9 and the other side wall 57 or 59 of power supply 21. Further, as disclosed in our previous patent application titled, "RACKMOUNT FOR COMPUTER AND MASS STORAGE ENCLOSURE", sled 19 is also fully insertable into electrical interengagement in the mass storage unit disclosed and claimed therein as shown in FIG. 6.

Figure 15:
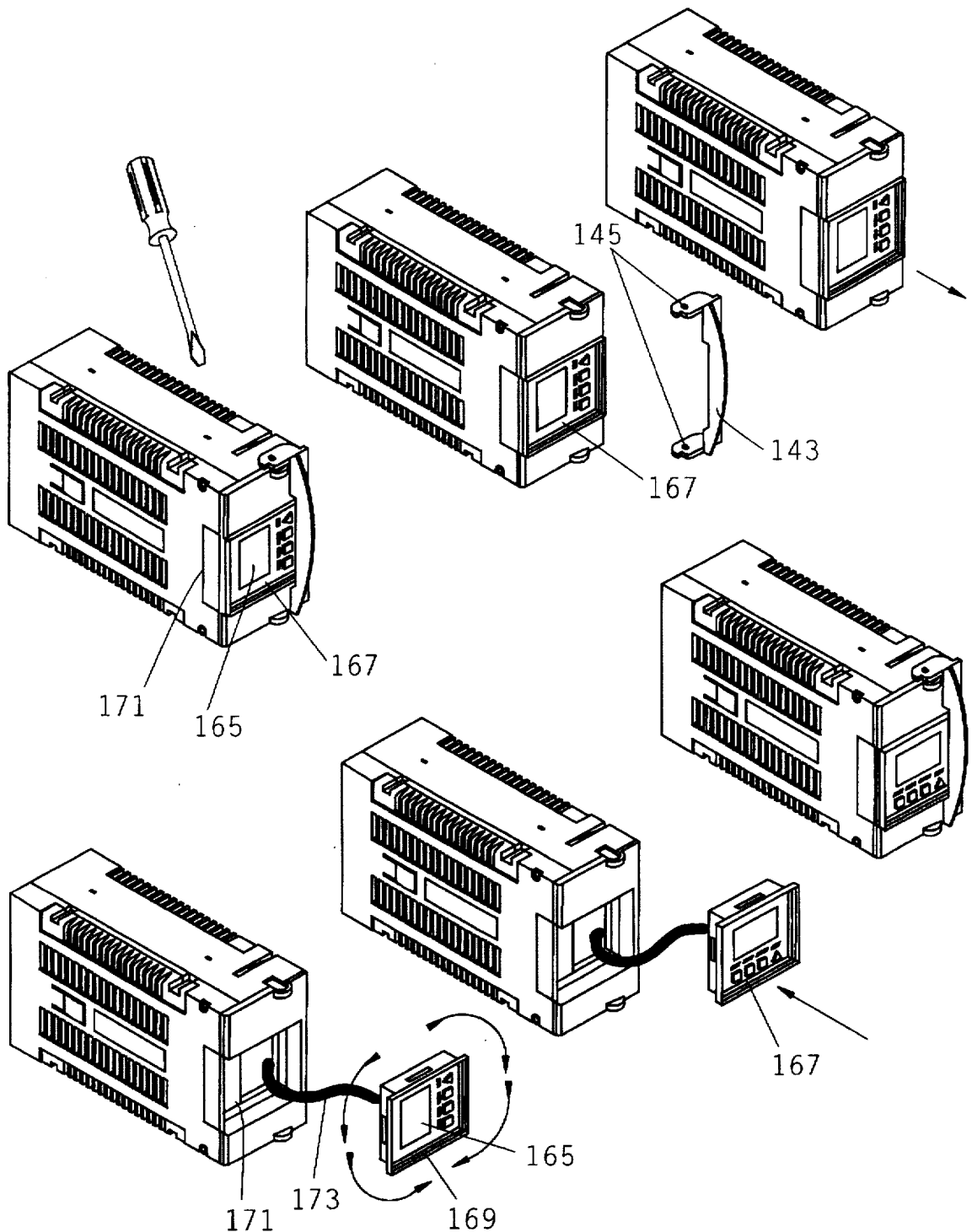
FIG. 15 is an illustrative view in sequence of the steps needed to rotate the LCD to retain the display in upright orientation when the peripheral sled is stacked vertically as opposed to horizontally.

Another unique feature of this invention is an LCD display 165 and associated keypad 167 formed in sled front wall 33 for displaying status, diagnostics, and other data. As shown in FIGS. 1, and 13a 15, a frame 169 is provided surrounding LCD 165 and keypad 167 and supports these devices by frictional fit in an aperture 171 formed in sled front wall 33 preferably centered in sled 19. A flexible cable 173 is attached to the rear of LCD display 165 and keypad 167 and extends inward into the interior of sled 19 into connection with the peripheral housed therein.

A novel feature of this invention is that frame 169 is made square as is aperture 171 and cable 173 is of sufficient length to allow said frame to be pried, by finger pressure, out of aperture 171 and rotated 90° and reassembled therein so that LCD display 165 shows the information thereon, in upright form, when enclosures 1 are interlocked and set vertically on a resting surface. This prevents the user from having to turn his/her head sideways to read the display information when the enclosure is rotated from horizontal to vertical. Other two-dimensional geometric shapes are also useful therein such as circles and equilateral triangles. As shown in FIG. 15, to change LCD display 165 from horizontal to vertical orientation, one need only pry one of lugs 145 off of its associated pin 147 and displace handle 143 outward from the front wall 33 of sled 19, then simply pry LCD display frame 169 from its frictional fit in aperture 171, rotate said frame 90° and then press it back into frictional fit in aperture 171.

Figure 9A:
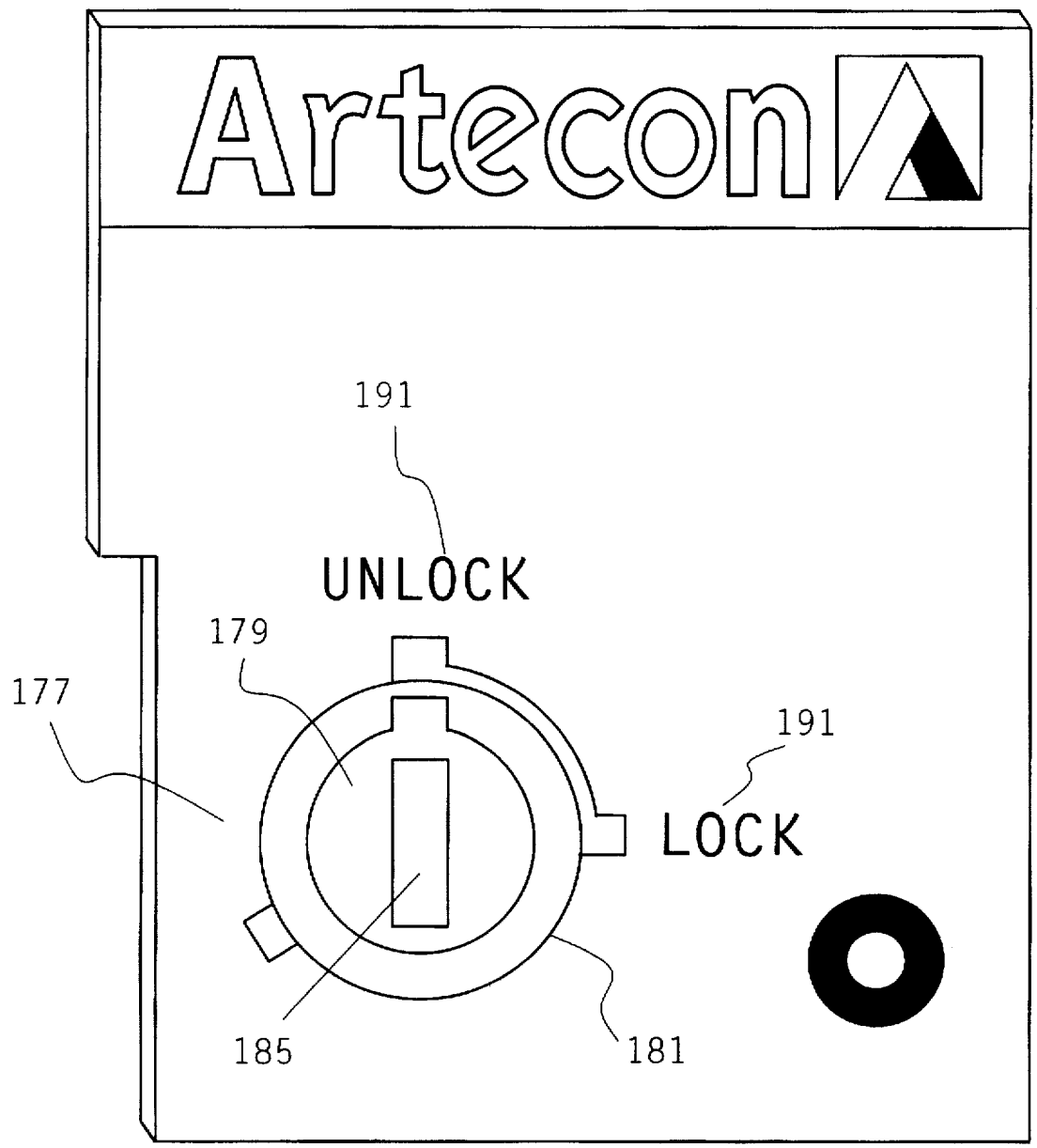
FIGS. 9a and 9b are illustrative views of a typical removable power supply showing the latching positions available for use when inserting, retaining and removing the power supply from the enclosure.
Figure 9B:
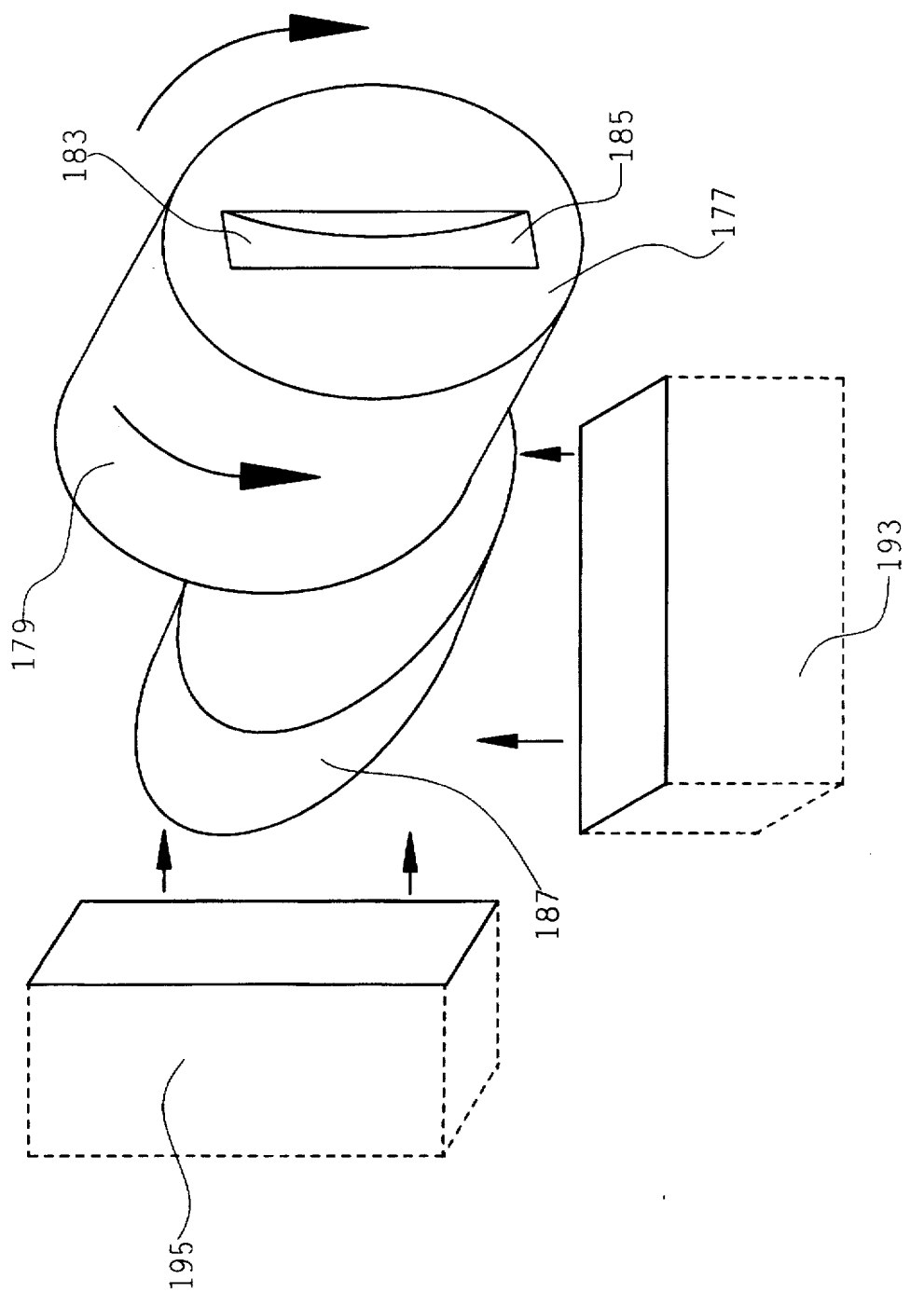

When the option is provided to withdraw power supply 21 and sled 19 from enclosure cavity 15, a unique lock 177 is employed to prevent unwanted withdrawals of either item from enclosure cavity 15. As shown in FIGS. 9a and 9b, lock 177 comprises a cylindrical element or wheel 179 pivotally mounted in a similar-sized aperture 181 formed in power supply front wall 33 for twisting movement through a wheel turning fitting 183 that is shown in FIG. 9b to be a slot 185 for receipt of the edge of a coin. A camming surface 187 is formed on wheel 179, interior of power supply front wall 33, and rotates in a first slot 189 formed therein. Said camming surface 187 moves as a function of the position of slot 185 and indicia 191 are provided on power supply front wall 33 such as "lock" and "unlock" to show the position which one would turn slot 185 to in order to achieve the locking or unlocking of power supply 21 in enclosure cavity 15.

Second and third slots 193 and 195, respectively, are formed in bottom enclosure wall 5, adjacent front opening 17, and side wall 27 of sled 19. These slots are aligned with first slot 189 so that camming surface 187 can be rotated into either one or both of said slots, by turning slot 185 with a coin, to lock the power supply or the power supply and the sled in the enclosure. Wheel 179 is normally made of plastic, for cost savings and ease in turning in aperture 181. However, for security reasons, wheel 179 may be made from metal and may contain a common lock and key arrangement, including tumblers (not shown) that is common in the art, so that power supply 21 and/or sled 19 may be locked securely in enclosure 1.

While this invention has been described with respect to a preferred embodiment, one may modify the various elements and still remain within the scope of the claims that conclude this specification. It is the inventors' position that any modification which performs substantially the same function in substantially the same way to produce substantially the same result is within the scope and spirit of this invention and the claims.

What is claimed is:

1. A computer subsystem comprising at least two individual modular peripheral containment enclosures for stacking in horizontal or vertical alignment, each enclosure comprising:

a) broad top and bottom walls held in spaced-apart arrangement by opposed shorter side walls and a rear wall, said walls joined along their respective marginal edges to form a front opening and a cavity in said enclosure accessible through said front opening;

b) a sled for receipt therein of a computer peripheral, said sled receivable in said cavity through said front opening in said enclosure;

c) means extending rearward from said front enclosure opening interior said cavity for receiving therealong said sled in controlled alignment, said sled including a front face that aligns flush against said enclosure front opening when said sled is fully seated in said cavity;

d) means for electrically interconnecting the peripheral in said enclosure to the rest of the computer subsystem including a connector interior said cavity mateable with the peripheral in said sled and with the computer subsystem exterior said sled;

e) means for providing air cooling throughout said cavity, unimpeded by the stacking arrangement of said enclosures, including an aperture formed in at least one of said walls of each said enclosure for passage of air therethrough; and, f) means for interconnecting multiples of said enclosures in fixed horizontal or vertical, self-supporting arrangement for positioning on a surface, that does not adversely affect the cooling throughout said cavity by said cooling means, including means for maintaining a space between said surface and said enclosure wall nearest said surface wherein said means for interconnecting multiples of said enclosures includes:

i) first and second bars in spaced-apart engagement attached along the outside of said first enclosure side walls and extending from said bottom wall to said top wall;

ii) a flange extending from said first bar inward, along said bottom wall;

iii) said first bar and said flange including exterior surfaces, at least a portion of which are spaced from said first enclosure wall;

iv) an elongated latch and a channel formed in said first and second bars for receipt therein of said elongated latch in slidable engagement therewith; and, v) a hook formed in the upper end of said elongated latch extending above said first enclosure top wall and a notch formed in the lower portion of the first bar of a second enclosure stacked atop said first enclosure so that said elongated latch may be moved upward to engage said notch in said first bar for interconnecting said first and second said enclosures.

2. The subsystem of claim 1 further including a depression formed in said top wall adjacent each said bar and further including soft pads having a thickness greater than the depths of said depressions and of a size to fit in said depressions for insertion therein to provide vibration isolation to said enclosures and to space said enclosures apart from each other when arranged in stacked, interlocked attachment therebetween.

* * * * *